United States Patent
Kirchhoff et al.

(10) Patent No.: US 12,539,503 B2
(45) Date of Patent: Feb. 3, 2026

(54) ENVIRONMENTALLY FRIENDLY POLYMERIC SORBENT MATERIAL FOR THE EXTRACTION AND DETERMINATION OF RARE EARTH ELEMENTS, THORIUM, AND URANIUM

(71) Applicant: The University of Toledo, Toledo, OH (US)

(72) Inventors: Jon R. Kirchhoff, Toledo, OH (US); Sandhya Adhikari, Toledo, OH (US); Govind Sharma Shyam Sunder, Toledo, OH (US)

(73) Assignee: The University of Toledo, Toledo, OH (US)

( * ) Notice: Subject to any disclaimer, the term of this patent is extended or adjusted under 35 U.S.C. 154(b) by 430 days.

(21) Appl. No.: 18/227,497

(22) Filed: Jul. 28, 2023

(65) Prior Publication Data

US 2024/0050924 A1 Feb. 15, 2024

Related U.S. Application Data

(60) Provisional application No. 63/394,788, filed on Aug. 3, 2022.

(51) Int. Cl.
 *B01J 20/26* (2006.01)
 *B01D 15/20* (2006.01)
 *C08G 73/02* (2006.01)
 *C22B 3/24* (2006.01)
 *C22B 59/00* (2006.01)
 *C22B 60/02* (2006.01)

(52) U.S. Cl.
 CPC .......... *B01J 20/262* (2013.01); *B01D 15/203* (2013.01); *C08G 73/0206* (2013.01); *C22B 3/24* (2013.01); *C22B 59/00* (2013.01); *C22B 60/0265* (2013.01); *C22B 60/0291* (2013.01)

(58) Field of Classification Search
 CPC .. B01J 20/252; B01D 15/203; C08G 73/0206; C22B 3/24; C22B 59/00; C22B 60/0265; C22B 60/0291
 See application file for complete search history.

(56) References Cited

U.S. PATENT DOCUMENTS

| | | | |
|---|---|---|---|
| 8,993,621 B2 | 3/2015 | Liu et al. | |
| 10,703,721 B2 | 7/2020 | Priebe et al. | |
| 2019/0233429 A1 | 8/2019 | Salvatore | |
| 2020/0102410 A1 | 4/2020 | Kirchhoff et al. | |

OTHER PUBLICATIONS

CN 113106759 A machine translation and original document (Year: 2021).*
CN 114042059 A machine translation and original document (Year: 2022).*

* cited by examiner

*Primary Examiner* — Tima M. McGuthry-Banks
(74) *Attorney, Agent, or Firm* — MacMillan, Sobanski & Todd, LLC

(57) ABSTRACT

A method for extracting a metal species from a solution is described, where the metal species comprises a rare earth element, Th, or U. The method involves the use of poly (caffeic acid) as a sorbent material. The poly(caffeic acid) may be crosslinked with a diamine crosslinker such as ethylenediamine.

20 Claims, 17 Drawing Sheets
(13 of 17 Drawing Sheet(s) Filed in Color)

ENVIRONMENTALLY FRIENDLY POLYMERIC SORBENT MATERIAL FOR THE EXTRACTION AND DETERMINATION OF RARE EARTH ELEMENTS, THORIUM, AND URANIUM

RELATED APPLICATIONS

This application claims priority to U.S. Provisional Application No. 63/394,788 filed under 35 U.S.C. § 111(b) on Aug. 3, 2022, the disclosure of which is incorporated herein by reference in its entirety.

STATEMENT REGARDING FEDERALLY SPONSORED RESEARCH

This invention was made with no government support. The government has no rights in this invention.

BACKGROUND

Rare earth elements (REEs) are a group of 15 elements in the periodic table which are referred to as the lanthanide series. Scandium and yttrium, which exhibit similar properties to lanthanides, are also included in this categorization. Among these seventeen REEs, neodymium (Nd), europium (Eu), dysprosium (Dy), terbium (Tb), and yttrium (Y) have been recognized as most critical by the U.S Department of Energy (DOE) for their use in industrial applications. REEs are critical materials that drive many sectors and modern industrial and defense technology. Owing to their unique electromagnetic, optical, catalytic, chemical, and metallurgical properties, REEs have been extensively used in permanent magnets, batteries, and even in agriculture as fertilizer and a growth promoter. Application of, and demand for, REEs have increased in the last decade as they are key components in many commonly used electronic devices and also in medical diagnostic reagents for magnetic resonance imaging. Therefore, REEs are sometimes referred to as "The Vitamins of Modern Industry".

The demand for scarcer REEs such as Nd or Dy has increased drastically. For instance, in 2019, global rare earth oxides (REOs) demand for the production of magnets was 43,733 metric tons, and this demand is expected to double to 82,469 metric tons by 2025. Over 85% of the global production of REEs from primary sources is dominated by China. Other countries are therefore highly dependent on China for REEs and suffered an economic setback due to the strict rules imposed by China on its REE exports. In addition, production of REEs from primary sources is quite tedious, time consuming, and involves the generation of large amounts of waste. Therefore, to ease such supply scarcity, efforts are being invested towards the extraction and recovery of REEs from secondary resources such as acid mine drainage, low grade REE industrial residues, and mine tailings, all of which are possible sources for REEs supply.

Solid-phase extraction is one of the preferred sample preparation techniques for its robustness, ease of handling, high preconcentration factor, and ability to selectively extract specific target substances by the availability of a wide range of sorbent materials. Interest in the utilization of various sorbent materials which incorporate coordinating functional groups in order to improve selectivity for metals has increased. N,N-dioctyl diglycol acid, ethylenediaminetetracetic acid (EDTA), and polyhydroxamic acid are examples of coordinating sorbent materials, which often require multi-step synthesis procedures and the incorporation of a solid support, consuming large amounts of solvents and reagents in the process. Synthetically developed materials tend to be expensive, consume large amounts of solvents and reagents in their preparation, and are very slow to biodegrade, leading to negative impacts on human health and the environment. In contrast, conventional natural catechol-based polymers, such as polydopamine (PDA), have been used to prepare coatings for the removal of different environmental pollutants including heavy metals and dyes. However, PDA alone tends to easily aggregate, which creates difficulty in separation.

There is a need for new, cost-effective, and eco-friendly materials for the removal and recovery of REEs.

SUMMARY

Provided is a method for extracting a metal species from a solution, the method comprising dispersing a sorbent material in an aqueous solution containing a metal species to form a dispersed solution in which the metal species coordinates with the sorbent material; and removing the sorbent material from the dispersed solution to extract the metal species from the aqueous solution; wherein the sorbent material comprises poly(caffeic acid); and wherein the metal species comprises a rare earth element, Th, or U.

In certain embodiments, the poly(caffeic acid) includes a crosslinker. In certain embodiments, the poly(caffeic acid) has a diamine crosslinker. In certain embodiments, the poly(caffeic acid) has an ethylenediamine crosslinker.

In certain embodiments, the sorbent material comprises Formula I:

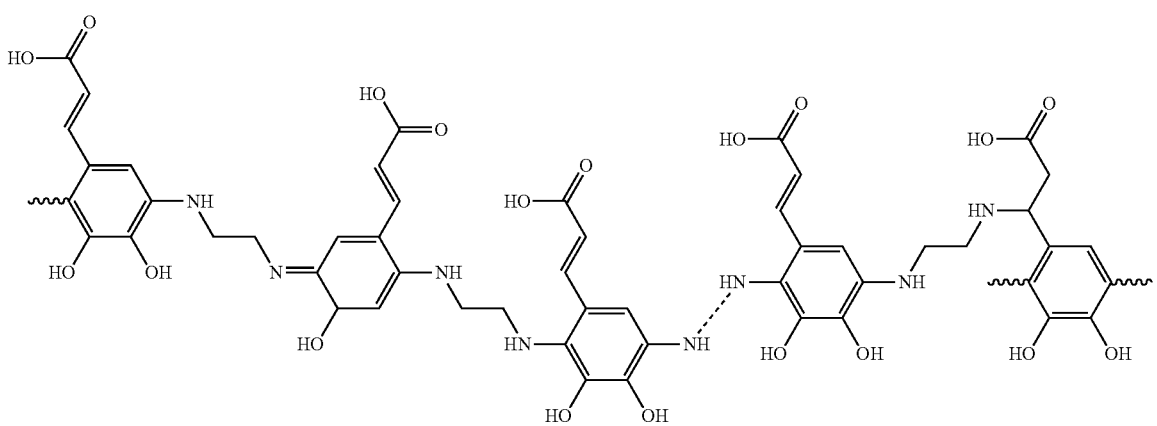

(I)

In certain embodiments, the sorbent material is dispersed in the aqueous solution without a support. In certain embodiments, the sorbent material is bound to a support. In certain embodiments, the sorbent material is not bound to a support. In certain embodiments, the sorbent material consists only of the poly(caffeic acid).

In certain embodiments, the rare earth element is La, Ce, Pr, Nd, Sm, Eu, Gd, Dy, Ho, Er, Tm, Yb, or Lu. In certain embodiments, the metal species is selected from the group consisting of Th and U. In certain embodiments, the metal species includes one or more of La, Ce, Pr, Nd, Sm, Eu, Gd, Dy, Ho, Er, Tm, Yb, Lu, Th, and U. In certain embodiments, the metal species includes a combination of elements from the group of La, Ce, Pr, Nd, Sm, Eu, Gd, Dy, Ho, Er, Tm, Yb, Lu, Th, and U. In certain embodiments, the rare earth element is a lanthanide.

In certain embodiments, the aqueous solution comprises a plurality of rare earth elements, and each of the plurality of rare earth elements is extracted by the sorbent material.

In certain embodiments, the dispersing consists of mixing the sorbent material in the aqueous solution.

In certain embodiments, the dispersing comprises mixing the sorbent material in the aqueous solution with ultra-sonication for a period of time. In particular embodiments, the period of time is about 5 minutes.

In certain embodiments, the aqueous solution has a pH ranging from 2.0 to 6.0.

In certain embodiments, the dispersing is conducted at room temperature.

In certain embodiments, the removing comprises filtering the dispersed solution to separate the sorbent material from the dispersed solution. In particular embodiments, the method comprises filtering the dispersed solution through a PTFE syringe filter. In particular embodiments, the method further comprises analyzing a filtrate from the filtering to determine a percent removal of the rare earth element.

In certain embodiments, the method further comprises washing the removed sorbent material with a desorption solvent to desorb the metal species from the sorbent material. In particular embodiments, the desorption solvent comprises an acid. In particular embodiments, the desorption solvent comprises $HNO_3$. In particular embodiments, the method further comprises collecting the desorption solvent. In particular embodiments, the method further comprises analyzing the collected desorption solvent to determine a percent recovery of the metal species. In particular embodiments, the method further comprises re-using the sorbent material for a further extraction of rare earth elements, Th, or U.

In certain embodiments, the aqueous solution further comprises one or more non-rare earth metal ion species.

In certain embodiments, the aqueous solution is from a natural body of water.

Further provided is a composition comprising poly(caffeic acid) dispersed in an aqueous solution containing a rare earth element, Th, or U. In certain embodiments, the poly(caffeic acid) is crosslinked with a diamine. In certain embodiments, the poly(caffeic acid) is crosslinked with ethylenediamine. In certain embodiments, the rare earth element is La, Ce, Pr, Nd, Sm, Eu, Gd, Dy, Ho, Er, Tm, Yb, or Lu. In certain embodiments, the metal species includes two or more of La, Ce, Pr, Nd, Sm, Eu, Gd, Dy, Ho, Er, Tm, Yb, Lu, Th, and U.

Further provided is the use of poly(caffeic acid) to extract a metal species from a solution, wherein the metal species comprises a rare earth element, Th, or U. In certain embodiments, the poly(caffeic acid) comprises a diamine crosslinker. In certain embodiments, the poly(caffeic acid) comprises an ethylenediamine crosslinker.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

In accordance with the present disclosure, poly(caffeic acid) can be used as a sorbent material that is highly selective for REEs, thorium (Th), and uranium (U), and useful in various extraction methods for the recovery of REEs, Th, and U from aqueous solutions. The poly(caffeic acid) may be crosslinked, such as with a diamine crosslinker.

Caffeic acid (CA, 3,4-dihydroxycinnamic acid), the monomer from which poly(caffeic acid) is produced, is a naturally occurring phenolic compound commonly found in coffee, fruits, and vegetables. Caffeic acid is ubiquitous in plant tissue and is considered an environmentally friendly material. In addition to carboxylate and C=C groups, caffeic acid has catechol moieties, which are effective metal chelators.

Figure 1:
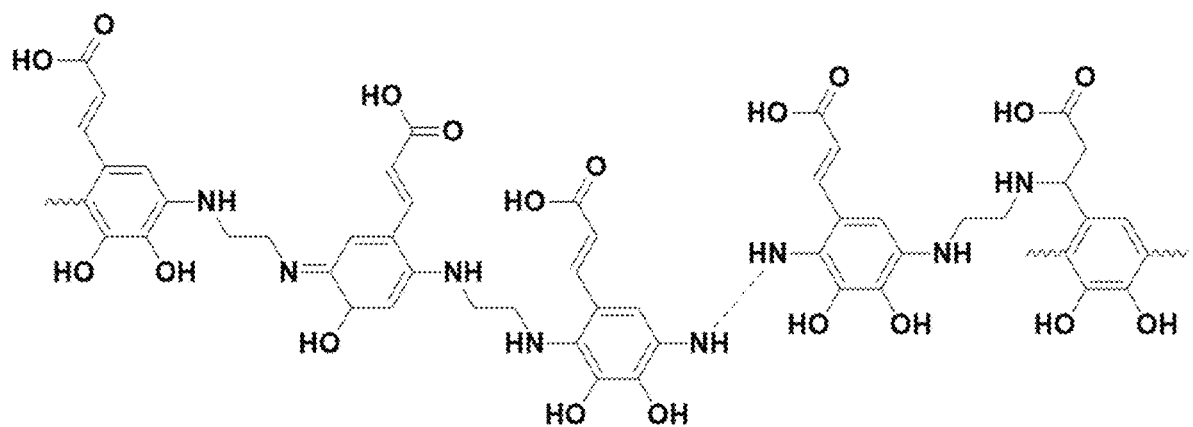
FIG. 1: Structure of poly(caffeic acid) with an ethylenediamine crosslinker.
Figure 2:
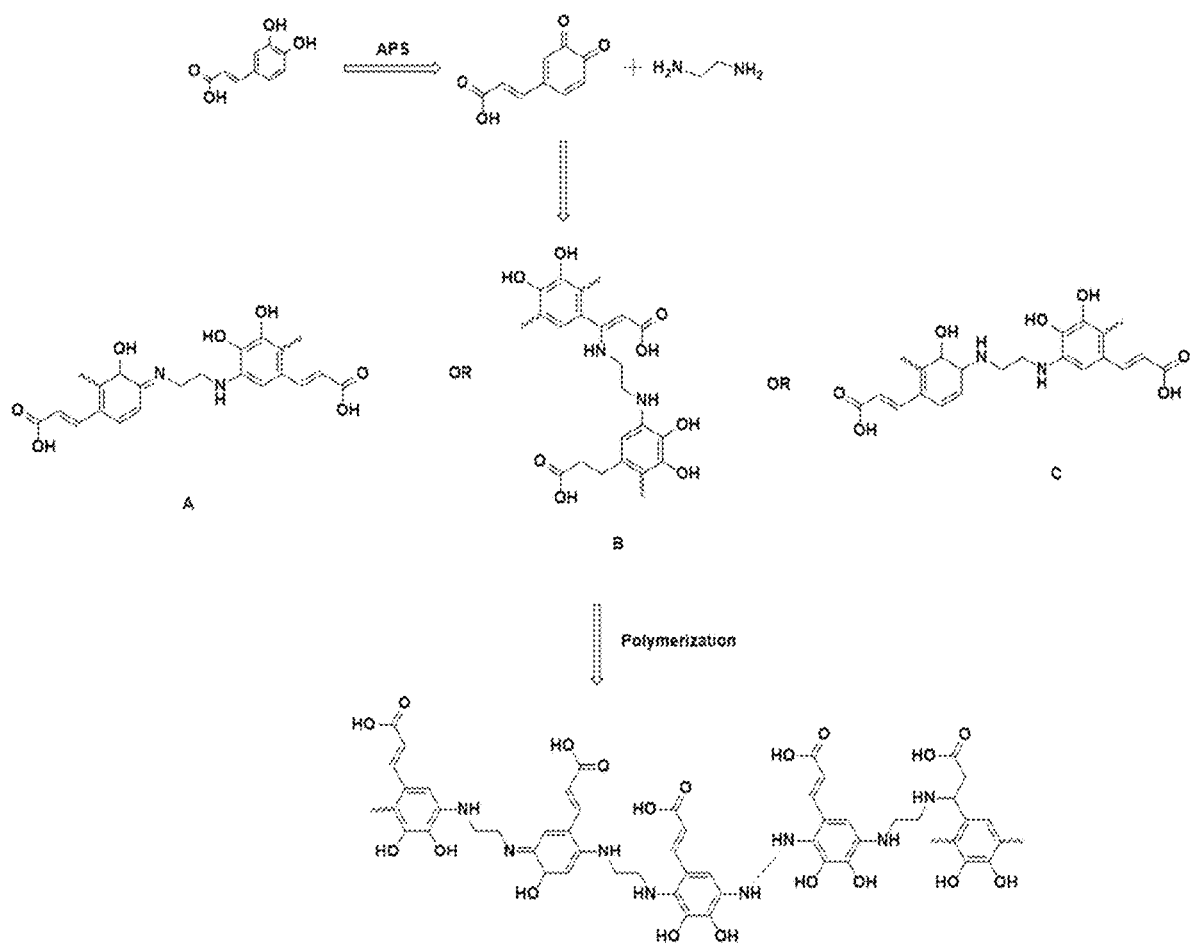
FIG. 2: Scheme 1, depicting a non-limiting example synthetic route for the preparation of poly(caffeic acid).

Caffeic acid is a catechol similar to dopamine and ubiquitous in plant tissue, making caffeic acid far less expensive than polydopamine Under normal synthetic conditions, the oxidation of caffeic acid results in a less stable quinonoid structure. In contrast, the use of ammonium persulfate as the oxidant and ethylenediamine as a linker achieves rapid synthesis of a stable form of poly(caffeic acid). Caffeic acid can be polymerized into poly(caffeic acid) through various processes, including with the use of a diamine crosslinker which not only acts as a crosslinker but also accelerates the polymerization reaction. As a non-limiting example, poly (caffeic acid) having an ethylenediamine crosslinker (FIG. 1) can be prepared as shown in Scheme 1 (FIG. 2). As seen in FIG. 2, ammonium persulfate (APS) can be used as an oxidant. However, other oxidants can be used. The polymerization reaction is fast, and can be done within 10 minutes. The amino group of ethylenediamine has been found to accelerate the polymerization of caffeic acid, and to act as a crosslinker between catechol chains through a Michael addition and a Schiff base reaction. However, various diamines other than ethylenediamine can be used. The resulting poly(caffeic acid) has carboxylate, catechol, and diamine groups which can coordinate with metals. The resulting poly(caffeic acid) is a water insoluble, granular, air-stable material that is highly oxygenated with a diamine crosslinker capable of chelating metal ions. Furthermore, poly(caffeic acid) is also insoluble and highly dispersible in water. The poly(caffeic acid) may have the following Formula (I):

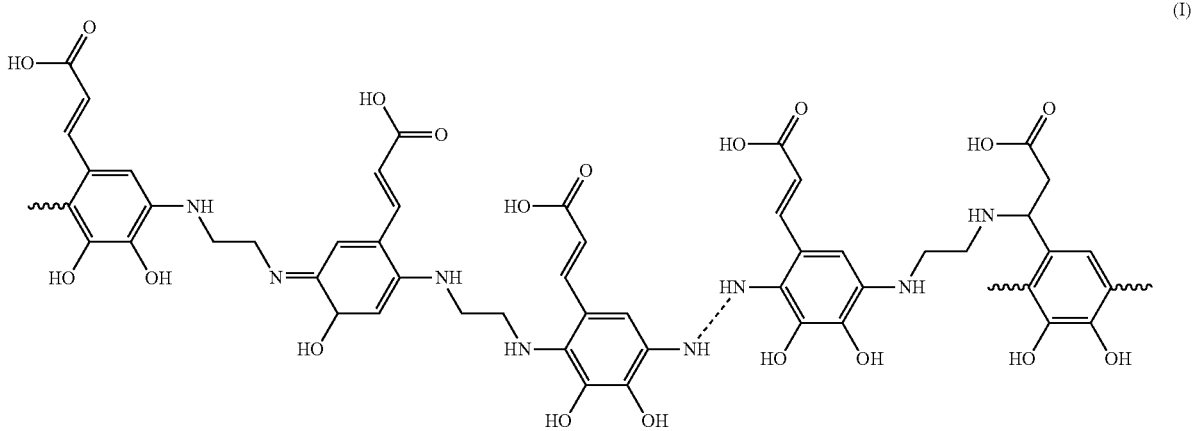

However, other methods of producing poly(caffeic acid), and other specific forms of poly(caffeic acid), are possible and encompassed within the scope of the present disclosure.

As shown in the examples herein, poly(caffeic acid) can be utilized in extraction methods to selectively extract one or more REEs, Th, and/or U, out of aqueous solutions, even if the aqueous solutions contain metal species in addition to the REEs, Th, and/or U. Advantageously, because caffeic acid is a naturally derived material, poly(caffeic acid) can be considered a green alternative for cleaner and more environmentally friendly separation processes. Relative to other REE sorbent materials such as the N-functionalized pyrrole polymer, poly(pyrrole-1-carboxylic acid), poly(caffeic acid) is more environmentally friendly, is easier to synthesize, and is also highly oxygenated, thereby providing the active sites for metal coordination.

An example method for extracting a REE, Th, or U from an aqueous solution utilizing the sorbent material described herein may include dispersing the sorbent material (i.e., the poly(caffeic acid)) in an aqueous solution containing a REE, Th, or U to form a dispersed solution in which the REE, Th, or U coordinates with the sorbent material, and removing the sorbent material from the dispersed solution to extract the REE, Th, or U from the solution. The solution may be, for example, from a natural body of water, such as a stream or river.

The dispersion of the poly(caffeic acid) in the aqueous solution can be accomplished by simple mixing or with the aid of sonication. The poly(caffeic acid) can be used in such a method as a free-standing material, without the need for a substrate or other support. However, optionally, the poly(caffeic acid) may be bound to a support if desired for a particular application. The poly(caffeic acid) with REE, Th, and/or U coordinated therewith may be removed from the solution through any solid-liquid separation process such as filtration. Once the poly(caffeic acid) with the REE, Th, and/or U coordinated therewith is removed from the solution, the poly(caffeic acid) can be rinsed with a desorption solvent to remove the preconcentrated REE, Th, and/or U from the poly(caffeic acid). The desorption solvent may be, for instance, an acid such as $HNO_3$. The desorption solvent effectively removes the coordinated REE, Th, and/or U from the poly(caffeic acid) because the coordination between poly(caffeic acid) and REEs, Th, and U is somewhat pH-dependent. Accordingly, solutions having a very low pH (i.e., about 2.0 or less) can be used to effectively desorb REEs, Th, and U from the poly(caffeic acid). Thereafter, the poly(caffeic acid) can be re-used in another or different extraction process if desired.

Figure 10:
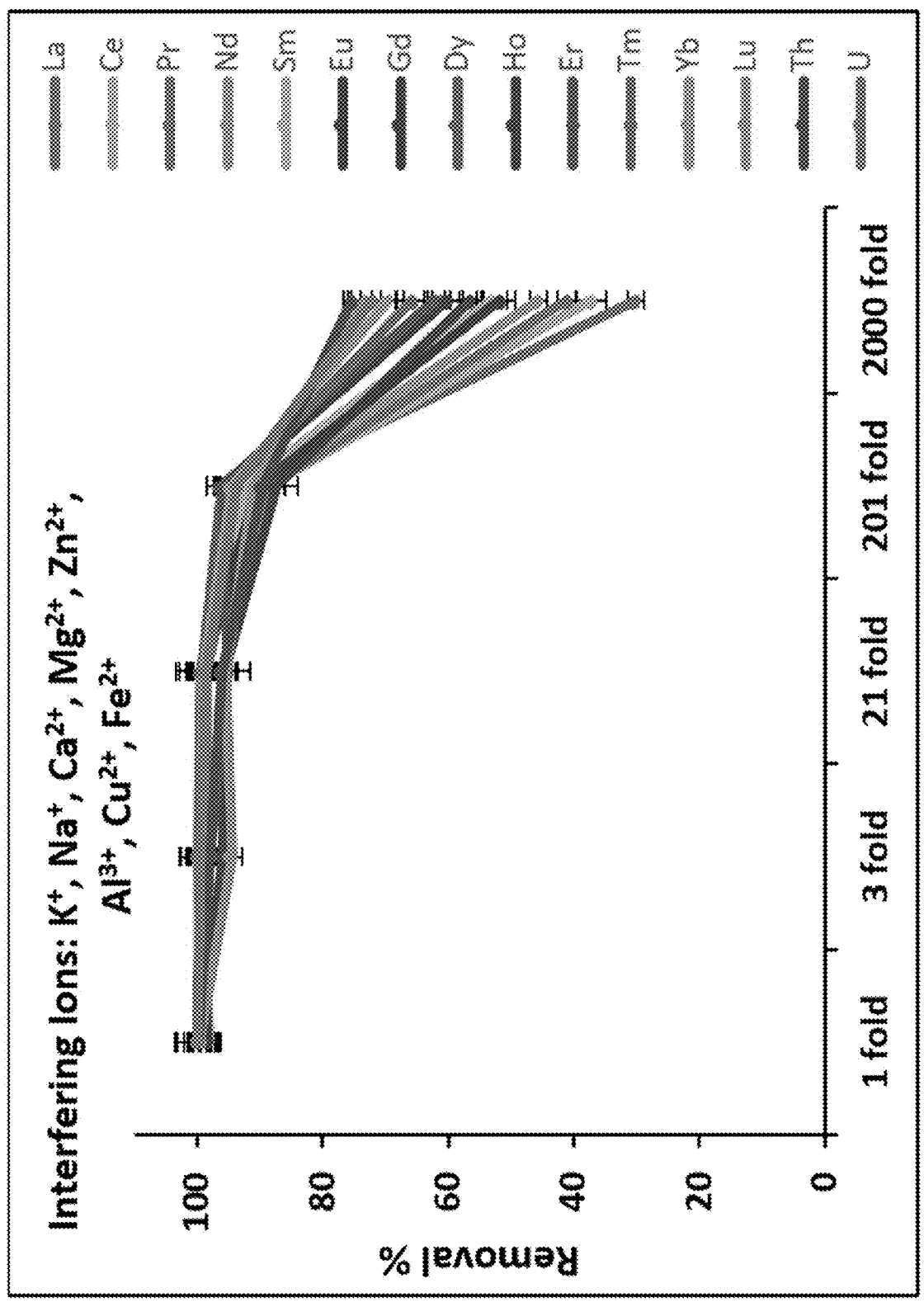
FIG. 10: Effect of different interfering ions on the sorption of REEs. Extraction conditions: metal ion concentration: 50 µg $L^{-1}$ each; pH: 6; amount of sorbent: 10 mg; sorption time: 5 min; sample volume: 40 mL. n=3.

As demonstrated in the examples herein, even in the presence of many possible interfering metal ion species, poly(caffeic acid) can efficiently extract REEs, Th, and U. (FIG. 10.) This makes poly(caffeic acid) a highly useful sorbent material for the extraction of REEs, Th, and U, because it can target these metals in complex matrices. Moreover, the limits of detection and quantification using poly(caffeic acid) for the analysis of REEs are comparable to previously reported materials. Because caffeic acid is far less expensive than other sorbent materials, poly(caffeic acid) can be produced in a cost effective manner Poly(caffeic acid) can be prepared from low cost, environmentally friendly materials. The analytical method is highly sensitive, reproducible, and applicable for the determination of a wide range of concentrations (wide LDR). Furthermore, the sorbent material has a high capacity. As one example, the polymer capacity is 161.7 mg/g polymer for the REE La.

The sorbent material can be used in solid-phase extraction methods, which allow extraction, preconcentration, and sample preparation to achieve efficient analysis and extraction of REEs at trace levels. A dispersive procedure can involve simple mixing of the insoluble sorbent and minimizes the use of organic solvents, making it a green technology. REE, Th, and U bulk recovery is also possible because the extraction methods are scalable. The sorbent material described herein may also be useful in water purification methods and apparatuses, such as in home water filters or at water treatment plants, as well as in a laboratory or a water treatment plant where solid phase extraction is used for metal analysis or removal. The sorbent material may be used to extract REEs, Th, and/or U from any aqueous medium.

EXAMPLES

These examples show that poly(caffeic acid) with an ethylenediamine crosslinker (FIG. 1) is useful as a stand-alone sorbent for the extraction, recovery, and determination of REEs, Th, and U. The plant based, low cost green sorbent material poly(caffeic acid) was synthesized from caffeic acid for dispersive solid phase extraction, and utilized for the extraction and determination of rare earth elements (REEs), thorium, and uranium. Oxidative polymerization of caffeic acid in the presence of ethylenediamine produced a granular, air stable, and cross-linked polymer. The polymer is highly oxygenated and together with the amino group from ethylenediamine efficiently coordinates and preconcentrates these critical elements from aqueous media. Extraction was dependent on solution pH, amount of sorbent, and extraction time, while concentration and flow rate of the desorption solution governed the recovery efficiency. Removal and recovery efficiencies greater than 98% and 90%, respectively, and low levels of detection ranging from 0.1-2.9 ng/L, were achieved. Determination of these strategic elements in the presence of potential interfering ions as well as in complex matrices such as well water and produced water samples was also demonstrated. The capacity of poly(caffeic acid) was determined with lanthanum as a representative REE to be 161.7 mg/g, establishing the suitability of poly(caffeic acid) for larger scale extractions in addition to the ability to screen sources for the presence of REEs.

The synthesized sorbent material was characterized by various techniques, namely, FTIR, SEM-EDX analysis, and nitrogen adsorption-desorption isotherm experiments. The extraction and determination of REEs, Th, and U with poly(caffeic acid) was investigated as a function of pH, extraction time, amount of sorbent, and the concentration and flow rate of the desorption solution. Additionally, capacity measurements for poly(caffeic acid) for potential bulk extractions, the effect of interfering ions in the extraction of REEs, Th, and U, and the reusability of poly(caffeic acid) were also studied. The results in these examples show that the poly(caffeic acid) sorbent material can efficiently preconcentrate rare earth elements (REEs), Thorium (Th), and Uranium (U) on the analytical scale and therefore be used for their removal and recovery from aqueous media. The impact of various parameters influencing preconcentration factors such as solution pH, amount of sorbent, extraction time, concentration of the desorption solution, and effect of flow rate of the desorption solution were carefully investigated and adjusted. Maximum efficiency for sorption and recovery of these strategic elements was achieved at a solution pH of 6.0, 10 mg of sorbent, a sorption time of 5 min, and desorption conditions of 2 mL of 1 M nitric acid applied at a flow rate of 0.125 mL min$^{-1}$. Excellent removal and recovery greater than 98% and 90%, respectively, for REEs were achieved under the selected conditions with detection limits ranging from 0.1-2.9 ng L$^{-1}$ with a linear dynamic range from 0.1-1000 µg L$^{-1}$. Additionally, analysis of targeted elements was performed in the presence of possible interfering ions as well as in the complex matrices such as well water and produced water samples, indicating its applicability in a wide range of applications.

Methods and Materials

Reagents and Solutions

All chemicals were of analytical grade and used as received. The pH was adjusted with dilute nitric acid and sodium hydroxide. Water from a Barnstead B-pure water purification system (>17 MΩ cm) was used for preparation of all aqueous solutions. An ICP-MS standard solution of REEs in 3% HNO$_3$ was obtained from Inorganic Ventures (Christiansburg, VA). Lanthanum nitrate was obtained from G. Frederick Smith Chemical Company (Columbus, OH). HPLC grade caffeic acid (CA, 98%) was purchased from Sigma Aldrich (Milwaukee, WI), ethylenediamine (EDA, >99%) was obtained from Acros Organics, and ammonium persulfate (APS) was purchased from Fisher Scientific (Pittsburgh, PA). Hydrophilic PTFE membrane (0.22 µm) syringe filters from Fisher Scientific (Pittsburgh, PA) were used for sample filtration.

Instrumentation

All samples were analyzed by a Thermo Scientific Xseries 2 inductively coupled plasma mass spectrometer (ICP-MS) equipped with a slurry nebulizer (San Jose, CA). A Perkin-Elmer Frontier Fourier transform infrared (FTIR) spectrometer (Shelton, CT) was used in the attenuated total reflectance mode. A JEOL JSM-7500F scanning electron microscope (JEOL USA, Inc., Peabody, MA) equipped with a BRUKER XFlash 5010 series energy-dispersive X-ray spectroscopy (EDX) detector (Billerica, MA) was used to obtain scanning electron microscopy (SEM) images and EDX spectra. Measurement of pH was performed using a Basic pH Meter (Denver Instrument Company, Denver, CO).

Nitrogen adsorption analysis was used to measure the specific surface area and pore volume of poly(caffeic acid). Nitrogen adsorption-desorption isotherms were measured at −196° C. on a 3Flex porosimetry analyzer (Micromeritics Instrument Corporation). The sample (≈0.4 g) was degassed in vacuum at 160° C. for 4 h and then the sample tube was backfilled with N$_2$. The isotherm was obtained by incremental exposure of the sample to ultrahigh-purity nitrogen (99.999%) at relative pressures (p/p$_0$) up to 1. Specific surface area was estimated using the Brunauer-Emmett-Teller (BET) method based on adsorption data in the relative pressure range p/p$_0$=0.05-0.2 and using a N$_2$ cross-sectional area of 0.162 nm$^2$. The total pore volume was estimated by converting the N$_2$ amount adsorbed at p/p$_0$≈0.99 to the volume of liquid nitrogen using the liquid nitrogen molar density of 34.38 cm$^3$ mol$^{-1}$.

Synthesis of Poly(Caffeic Acid)

The synthetic route for poly(caffeic acid) is shown in Scheme 1 (FIG. 2), where CA (0.72 g, 20 mmol/L) was completely dissolved in 200 mL DI water at 80° C., APS (0.20 g, 4.38 mmol/L) and EDA (141 µL, 10.57 mmol/L) were successively added, and the reaction mixture was stirred for 3 h at room temperature to complete polymerization. The insoluble polymer was separated from excess reagents and solvents by vacuum filtration and washed several times with ethanol and DI water. A dark brownish-black powder was obtained, air dried, and stored at room temperature.

Evaluation of Metal Ion Sorption by Poly(Caffeic Acid)

Quantitative evaluation of the extraction and recovery efficiencies of the polymer were conducted by the ultrasound assisted dispersive solid-phase extraction (UAD-SPE) approach with ICP-MS. First, 40 mL of an aqueous solution containing 50 µg L$^{-1}$ of each REE was transferred into a 50 mL disposable polypropylene tube. The pH of the solution was adjusted to 6.0 with 0.01 M nitric acid and 0.01 M sodium hydroxide solutions. Accordingly, 10 mg of poly(caffeic acid) was added and dispersed by ultra-sonication for 5 min at room temperature. The dispersed solution was carefully transferred to a 50 mL syringe and filtered using a 0.22 µm PTFE syringe filter. The filtrate was saved for determination of the percent removal by ICP-MS. The separated polymer was sequentially washed with deionized water and then 2 mL of 1 M HNO$_3$ was slowly passed through the filter to desorb the retained REEs. The desorption solution was collected in a new polypropylene tube and analyzed by ICP-MS to obtain the percent recovery.

The removal efficiency was calculated according to Eq. 1:

$$\text{Removal Efficiency \%} = \frac{C_o - C_e}{C_o} \times 100 \quad (1)$$

where C$_0$ is the initial concentration (µg L$^{-1}$) and C$_e$ is the remaining concentration (µg L$^{-1}$) of sample solution after extraction and filtration. The recovery efficiency was calculated from Eq. 2:

$$\text{Removal Efficiency \%} = \frac{n_f}{n_o} \times 100 = \left(\frac{C_f \times V_f}{C_o \times V_o}\right) \times 100 \quad (2)$$

where C$_f$ and V$_f$ are the final concentration and final volume of the desorbed solution, respectively. The relative recovery was calculated according to Eq. 3:

$$\text{Removal Efficiency \%} = \frac{C_{found} - C_{real}}{C_{spiked}} \times 100 \quad (3)$$

where C$_{found}$ is the concentration of metal ion after addition of a known amount of standard solution to the real sample, C$_{real}$ is the actual metal ion concentration in the real samples, and C$_{spiked}$ is the amount of standard solution that was spiked into the real samples.

Enrichment factors (EF) were calculated as the ratio of analyte concentration in the desorbed solution to the initial concentration in the sample.

Figure 12:
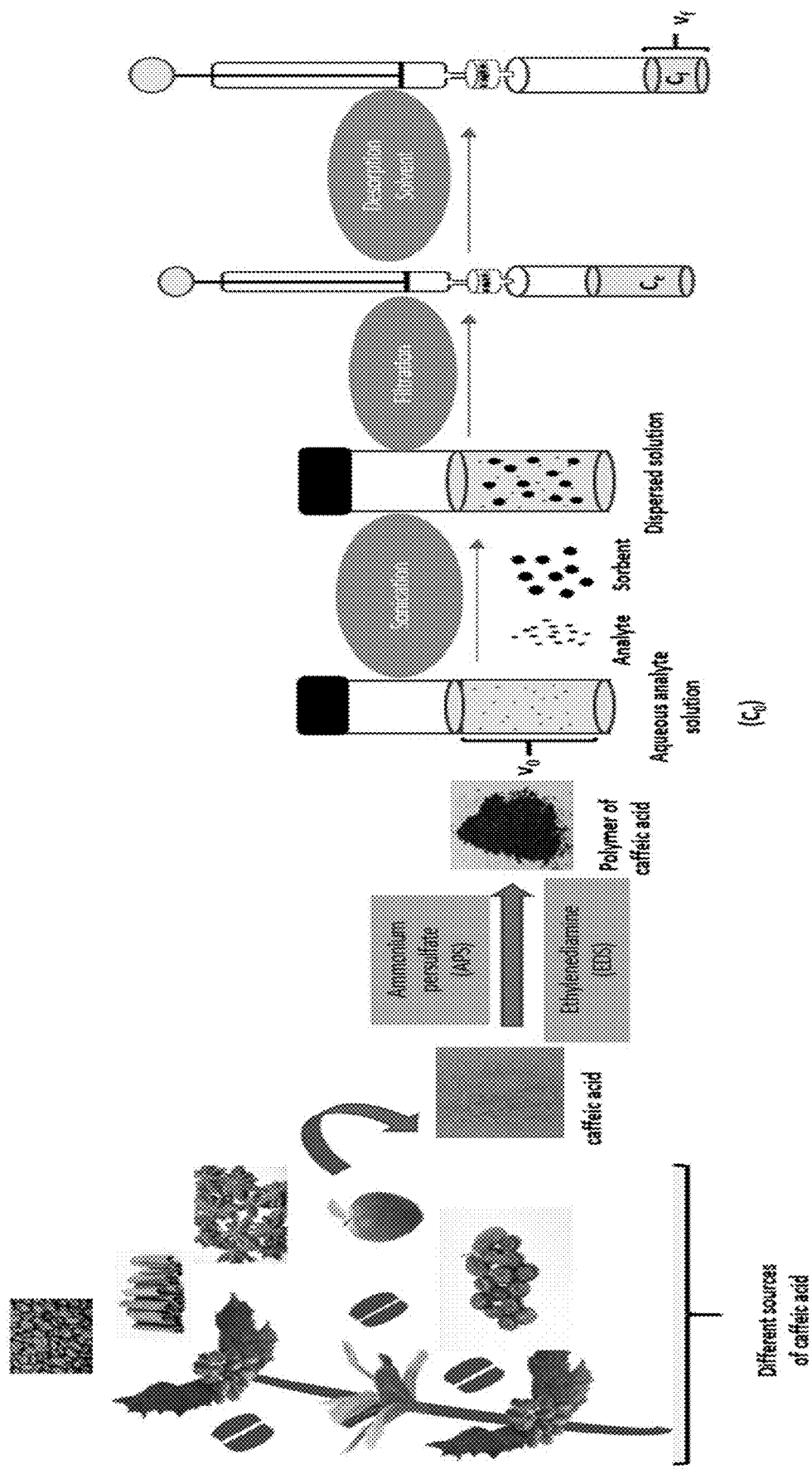
FIG. 12: Illustration of the general analysis protocol utilized in the examples herein.

FIG. 12 illustrates the general analysis protocol utilized in these examples.

Characterization of Poly(Caffeic Acid)

Figure 3A:
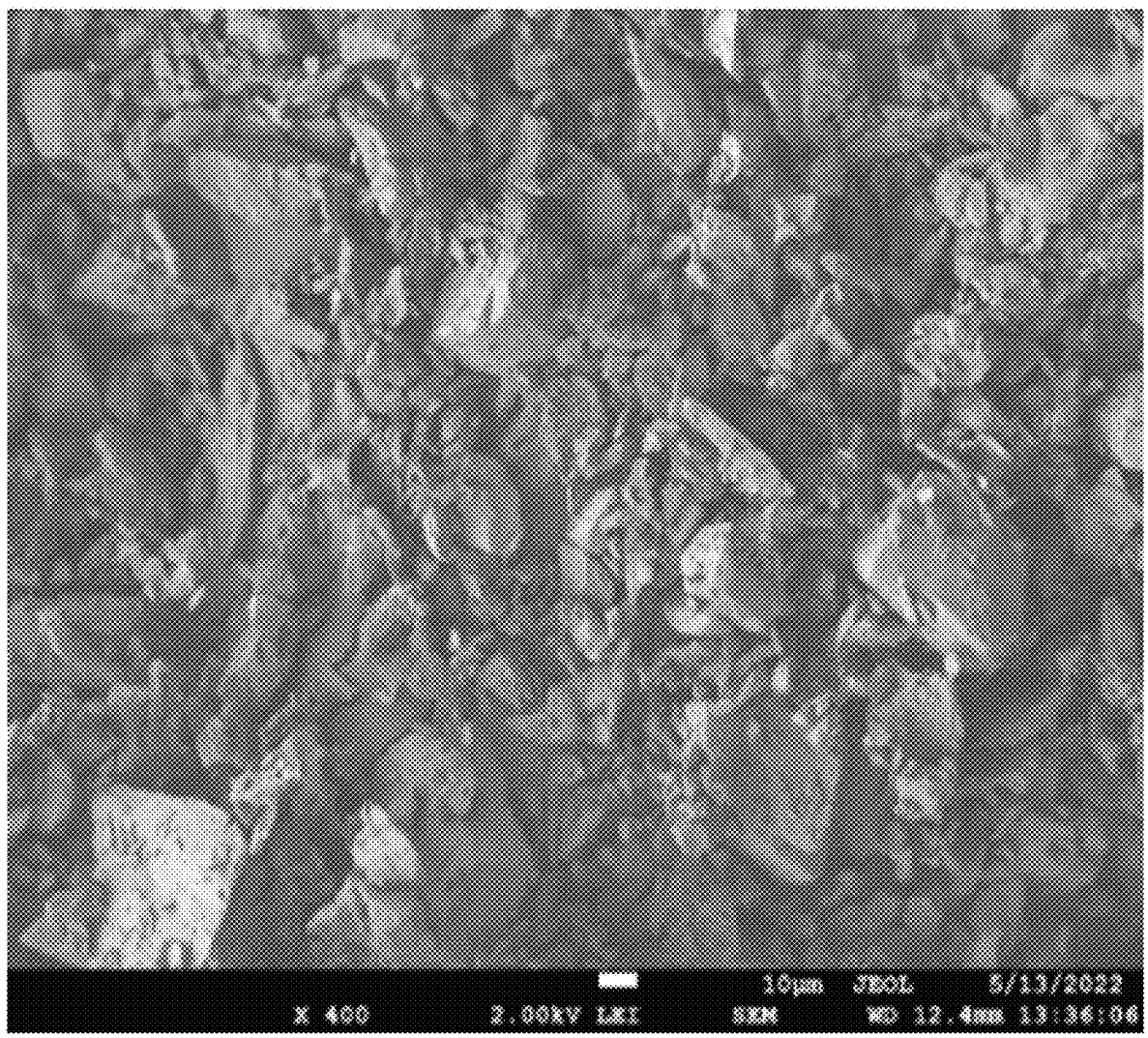
FIGS. 3A-3B: SEM images of caffeic acid (FIG. 3A) and poly(caffeic acid) (FIG. 3B).
Figure 3B:
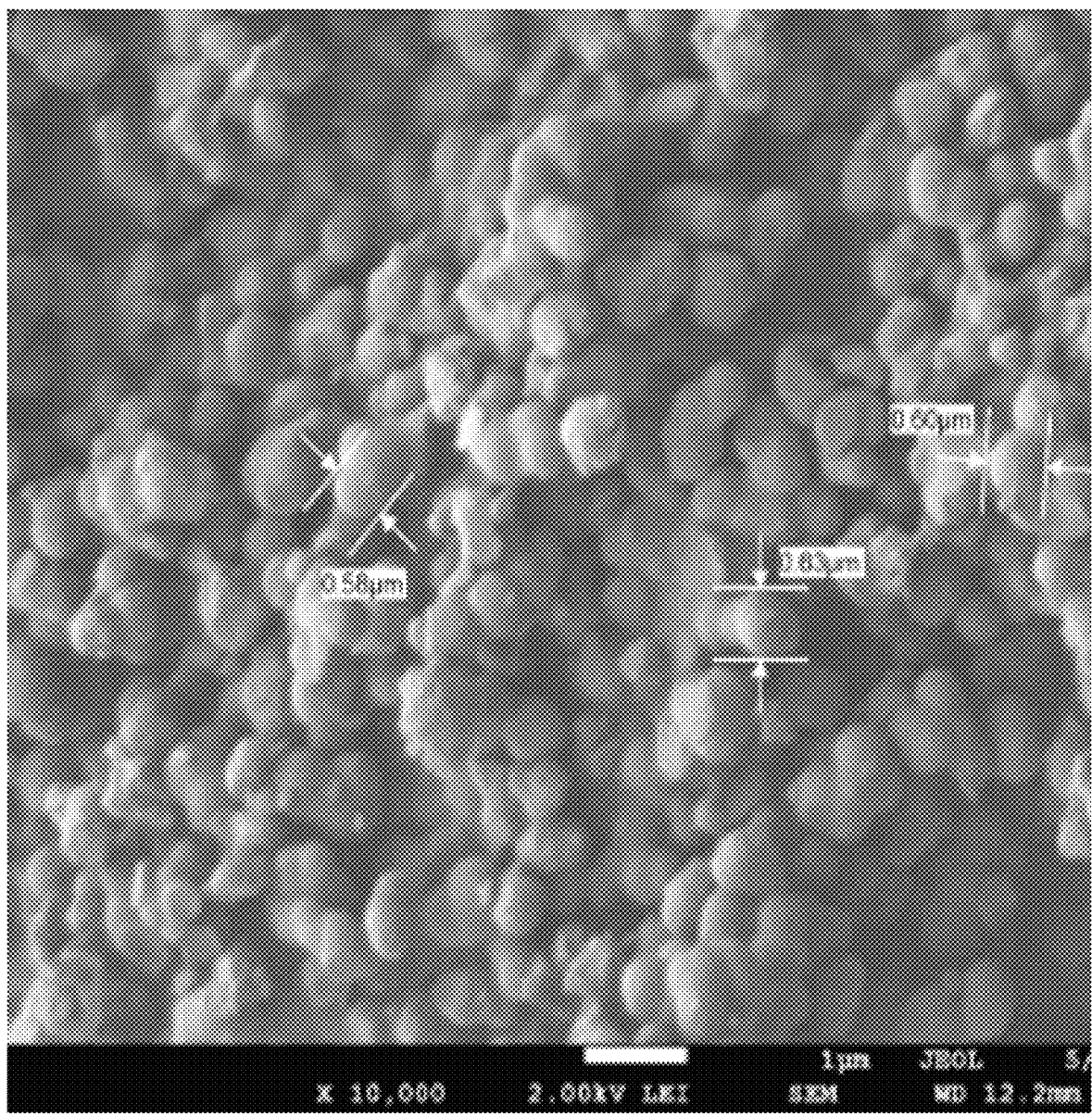
Figure 4:
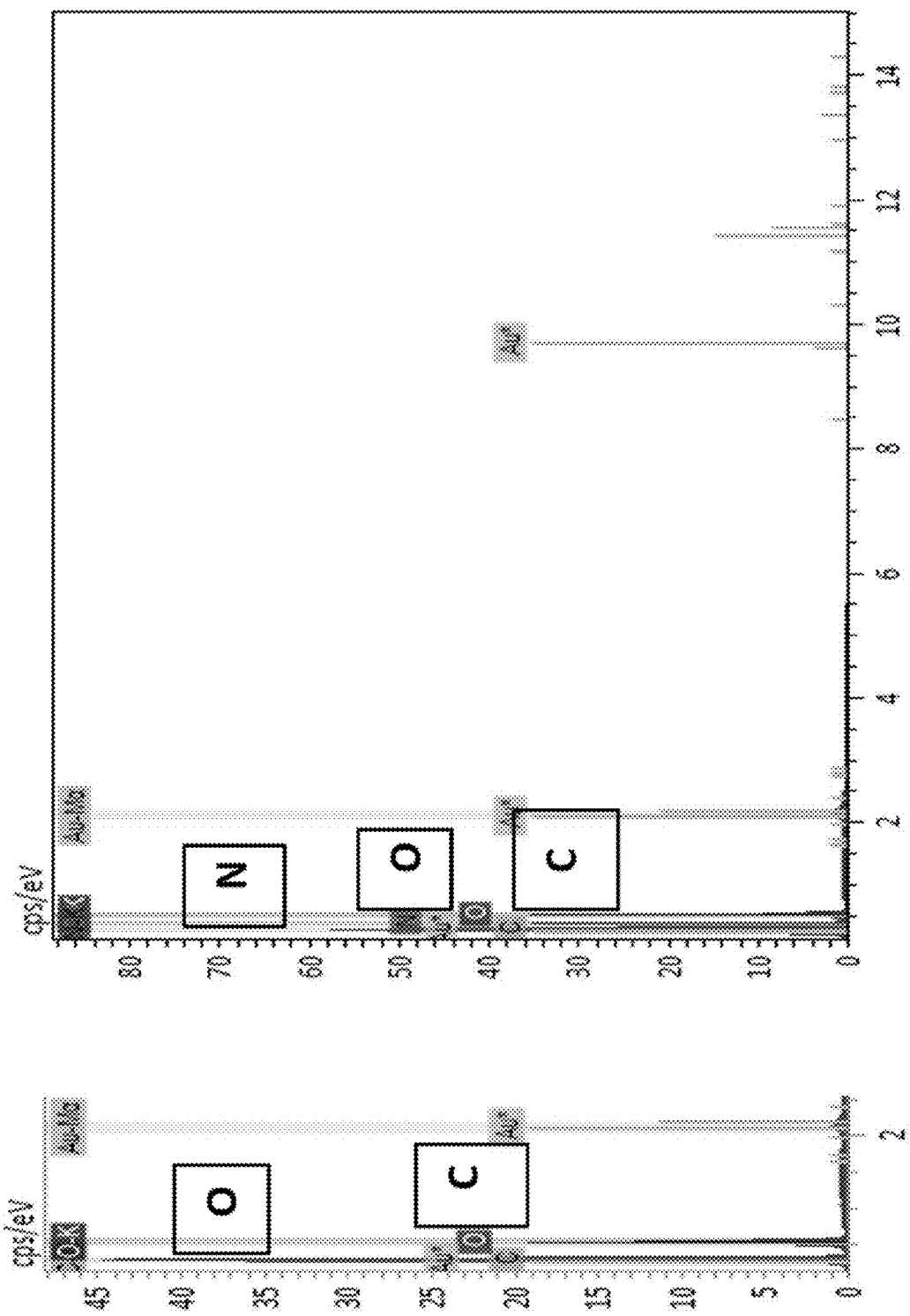
FIG. 4: EDX spectra of caffeic acid (left) and poly(caffeic acid) (right).
Figure 5:
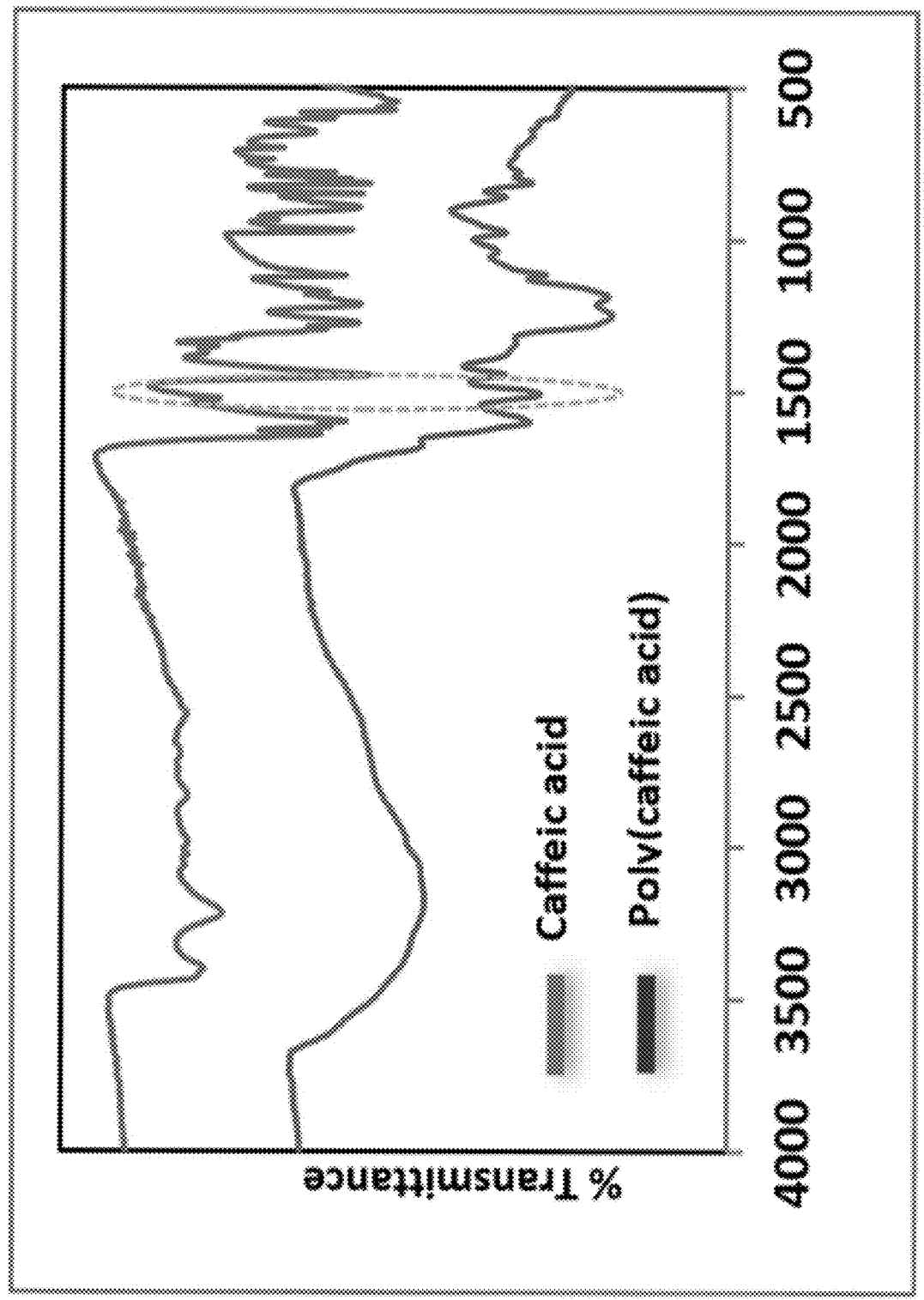
FIG. 5: FTIR spectra of caffeic acid and poly(caffeic acid).
Figure 13:
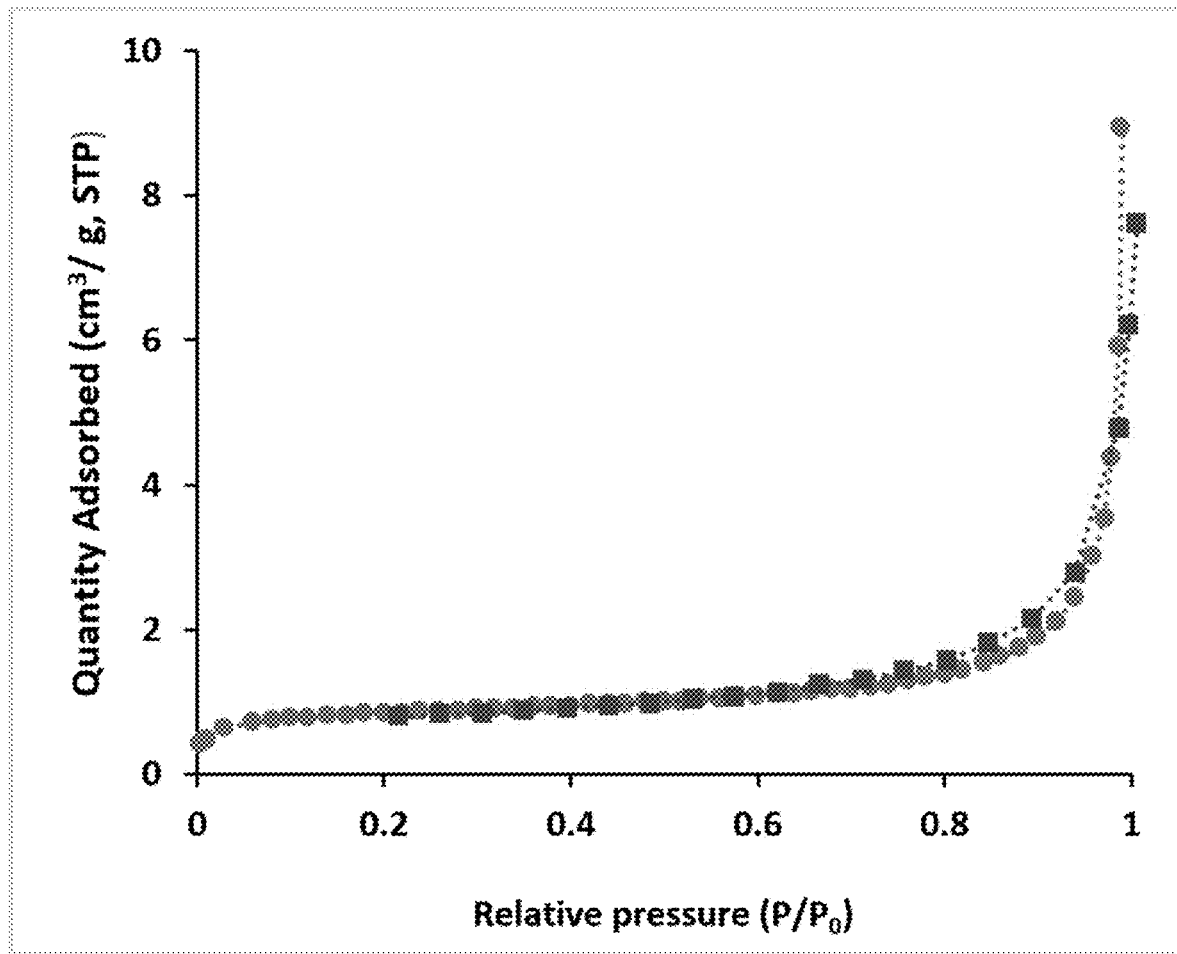
FIG. 13: Nitrogen adsorption-desorption of poly(caffeic acid).

The morphology of the synthesized poly(caffeic acid) was characterized by SEM and the chemical composition and functional groups were confirmed by EDX. As seen in FIGS. 3A-3B, poly(caffeic acid) is granular with a spherical shape compared to the course and irregular shape of caffeic acid. Similarly, the presence of nitrogen in the EDX spectra of the poly(caffeic acid) indicates the successful incorporation of ethylenediamine as a cross linker (FIG. 4). FTIR was also used to confirm the formation of polymer and incorporation of the amino groups. FIG. 5 shows the FTIR spectra of CA and poly(caffeic acid). Both CA and poly(caffeic acid) exhibit intense absorption peaks between 4000 cm$^{-1}$ and 2600 cm$^{-1}$, which were assigned to OH stretching vibrations, and partially overlap the weak CH stretching modes of the acyclic chain and benzene moiety. Similarly, the absorption peaks at 1450 cm$^{-1}$ and 1620 cm$^{-1}$ are associated with aromatic C=C stretching vibrations, and the vibration bands at 1645 cm$^{-1}$ and 1471 cm$^{-1}$ were attributed to CO stretching modes of the carbonyl group. In the case of poly(caffeic acid), the peaks at 3268 cm$^{-1}$ and 3333 cm$^{-1}$ were due to N—H and carboxylic acid O—H functional groups, respectively. In addition, the presence of the imine bond (C=N) is observed around 1650 cm and further confirms the successful N-atom incorporation. The specific surface area and total pore volume of poly(caffeic acid) were determined to be 3 m$^2$g$^{-1}$ and 0.01 cm$^3$g$^{-1}$, respectively, from a N$_2$ adsorption-desorption isotherm (FIG. 13). A calculated surface area less than 10 m$^2$g$^{-1}$ and very low total pore volume are consistent with a polymer that is nonporous, and indicate that extraction is dominated by coordination of the metals to surface functional groups rather than adsorption in pores.

Evaluation of Sorption Parameters

The properties of the polymer such as air stability, insolubility in aqueous media, and the ability to complex metals facilitate its utilization for the sorption, recovery, and analysis of metal ions in aqueous media. Various extraction and desorption parameters were adjusted to preconcentrate and recover REEs on the analytical scale by careful examination of the effects of extraction solution pH, amount of sorbent, extraction time, desorption flow rate, and the composition of the desorption solution.

Effect of pH

Figure 6:
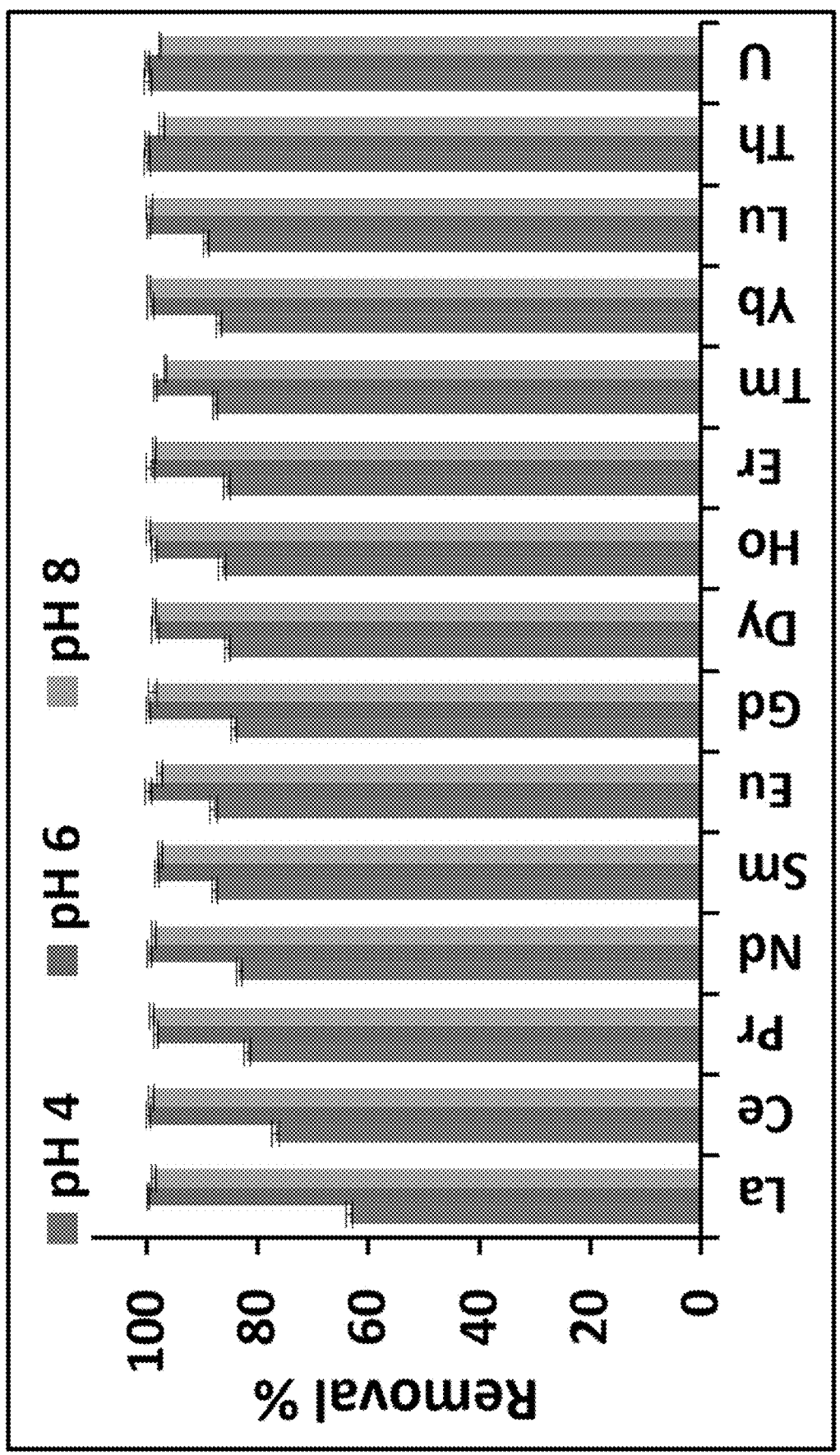
FIG. 6: Effect of pH on extraction efficiency. Extraction conditions: metal ion concentration: 50 µg $L^{-1}$ each; amount of polymer: 20 mg; sorption time: 30 min; sample volume: 40 mL. n=3.

The sorption efficiency was investigated as a function of the pH. Solution pH plays an important role with respect to the adsorption/complex formation of different metal ions on poly(caffeic acid) due to the oxygen substituents distributed throughout the polymer acting as pH-dependent active coordination sites for binding with REEs. Along with oxygen-containing functional groups, poly(caffeic acid) contains amines which are also known to coordinate metal ions. FIG. 6 summarizes the removal percentage of REEs as well as Th and U as a function of pH from 2.0 to 6.0. Low sorption efficiency at acidic pH is likely attributed to the protonation of the carboxylic functional groups as well as amide groups in the structure, whereas, as the pH increases, both —COOH and —OH groups are deprotonated resulting in a strong affinity for REEs and more effective coordination. Higher pH values were avoided to minimize the formation of metal hydroxides. Quantitative sorption for most REEs was achieved at pH 6 and this pH was therefore selected for further experiments.

Effect of Sorbent Amount

Figure 7:
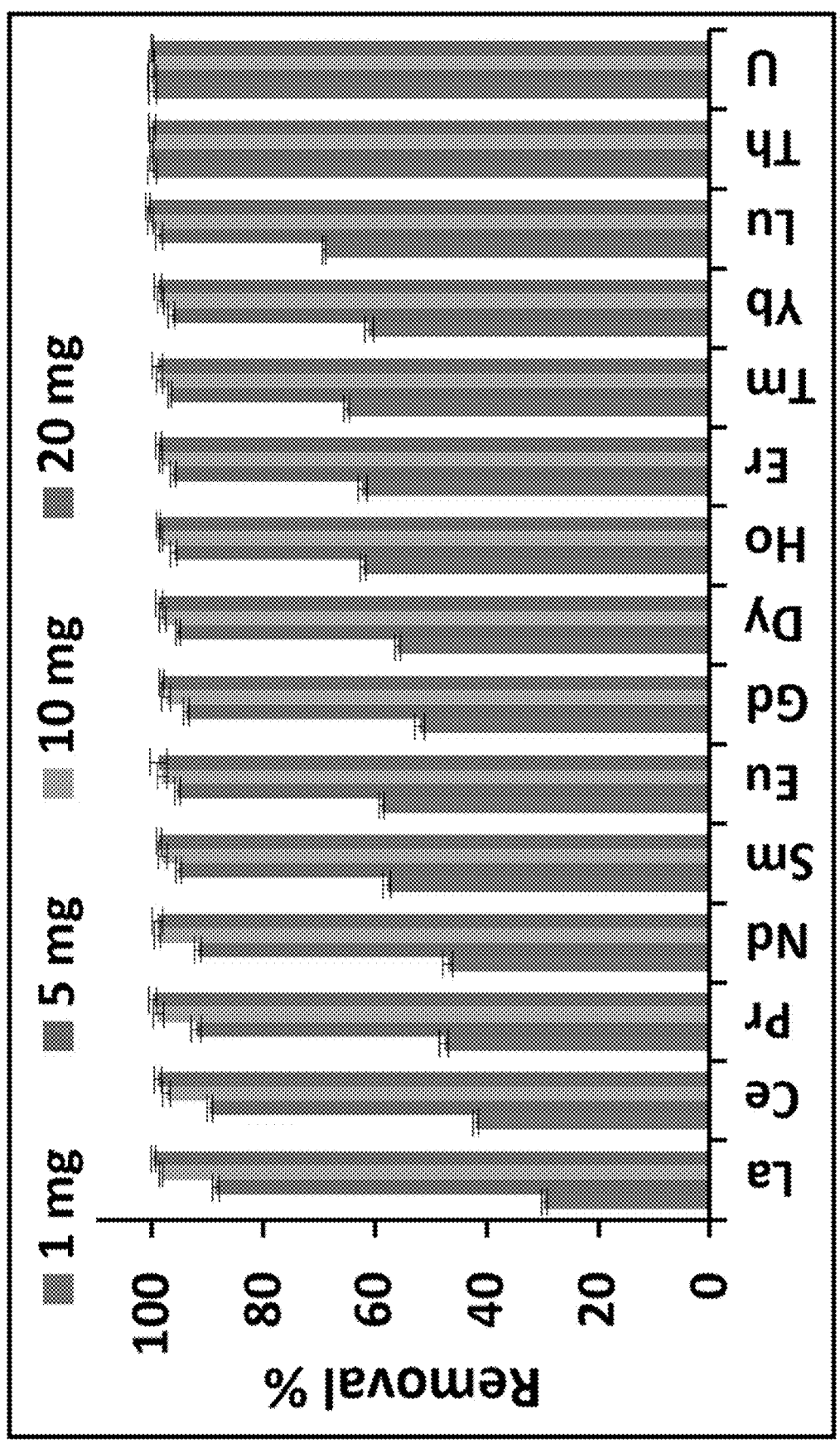
FIG. 7: Effect of sorbent amount on extraction efficiency. Extraction conditions: metal ion concentration: 50 µg $L^{-1}$ each; pH: 6; sorption time: 30 min; sample volume: 40 mL. n=3.

To explore the effect of the sorbent amount on the extraction efficiency of REEs, Th, and U, various amounts of the sorbent material from 1 to 20 mg were added to the initial analyte solution. As shown in FIG. 7, the sorption efficiency for REEs, Th, and U increased from 1 to 10 mg, and then remained essentially constant. It is interesting to note a clear difference for Th and U was observed. Above 1 mg of sorbent, the removal efficiency for Th and U remained almost the same (±10%) up to 20 mg. Therefore, 10 mg of the sorbent was sufficient to maximize the extraction of REEs, Th, and U and was selected for subsequent experiments.

Effect of Extraction Time

Figure 8:
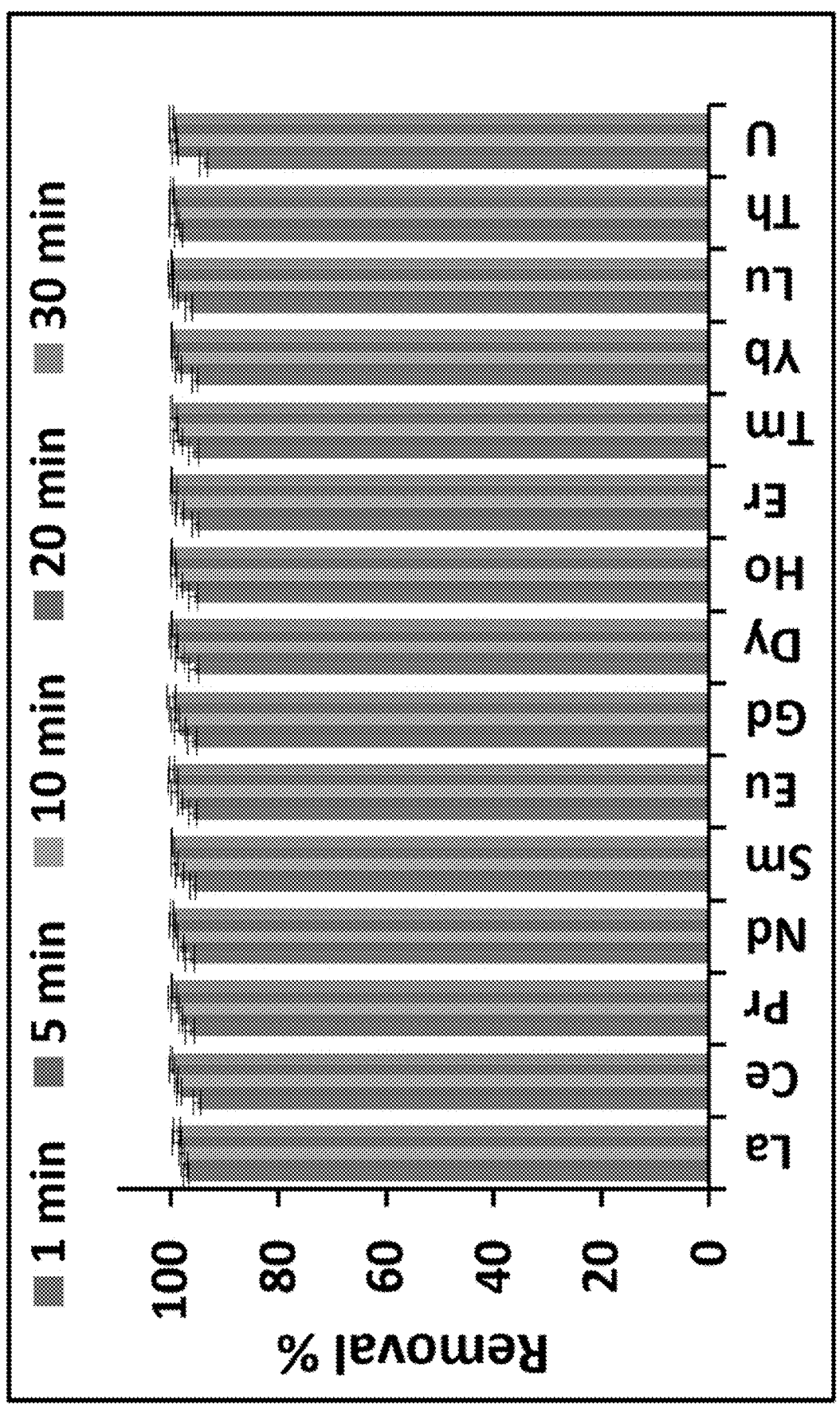
FIG. 8: Effect of extraction time on extraction efficiency. Extraction conditions: metal ion concentration: 50 µg $L^{-1}$ each; pH: 6; amount of sorbent: 10 mg; sample volume: 40 mL. n=3.

Extraction time is also one of the important parameters affecting the extraction efficiency. The extraction efficiency was investigated at 1, 5, 10, 20, and 30 min to achieve the best extraction efficiency with the shortest extraction time. The results are shown in FIG. 8. The extraction efficiency increased with extraction time from 1 to 5 min, after which it remained almost constant, indicating the extraction of the target metal ions by poly(caffeic acid) was fast and efficient. Therefore, 5 min was chosen as the equilibrium extraction time for further experiments.

Evaluation of Desorption Parameters

Figure 9A:
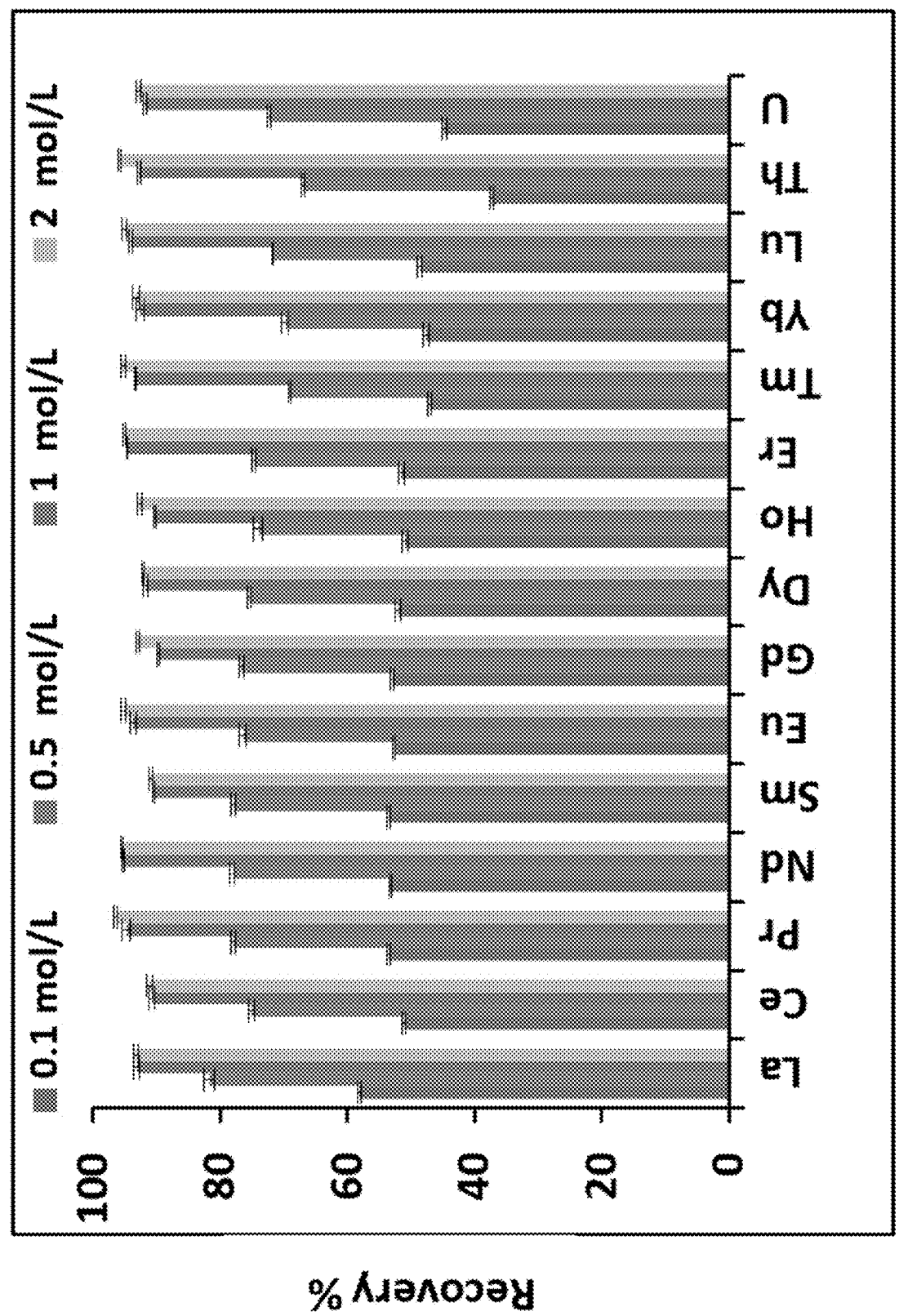
FIGS. 9A-9B: Effect of desorption solution acid concentration at a flow rate of 0.5 mL/min (FIG. 9A) and flow rate with a concentration of 1 M desorption solvent (FIG. 9B) on the recovery of metal ions. Extraction conditions: metal ion concentration: 50 µg $L^{-1}$ each; pH: 6; amount of sorbent: 10 mg; sorption time: 5 min; sample volume: 40 mL; n=3.

HNO$_3$ is the most compatible solvent for ICP-MS measurements and was used as the desorption solvent. In order to elute the retained metal ions from the sorbent, HNO$_3$ was used in different concentrations ranging from 0.1-2 M. It was observed that 1 M was sufficient to quantitatively recover the retained metal ions (FIG. 9A). Any further increase in HNO$_3$ concentration did not show any clear improvement in the recovery for the above metal ions. Therefore, 1 M of HNO$_3$ was chosen as the desorption solvent.

Figure 9B:
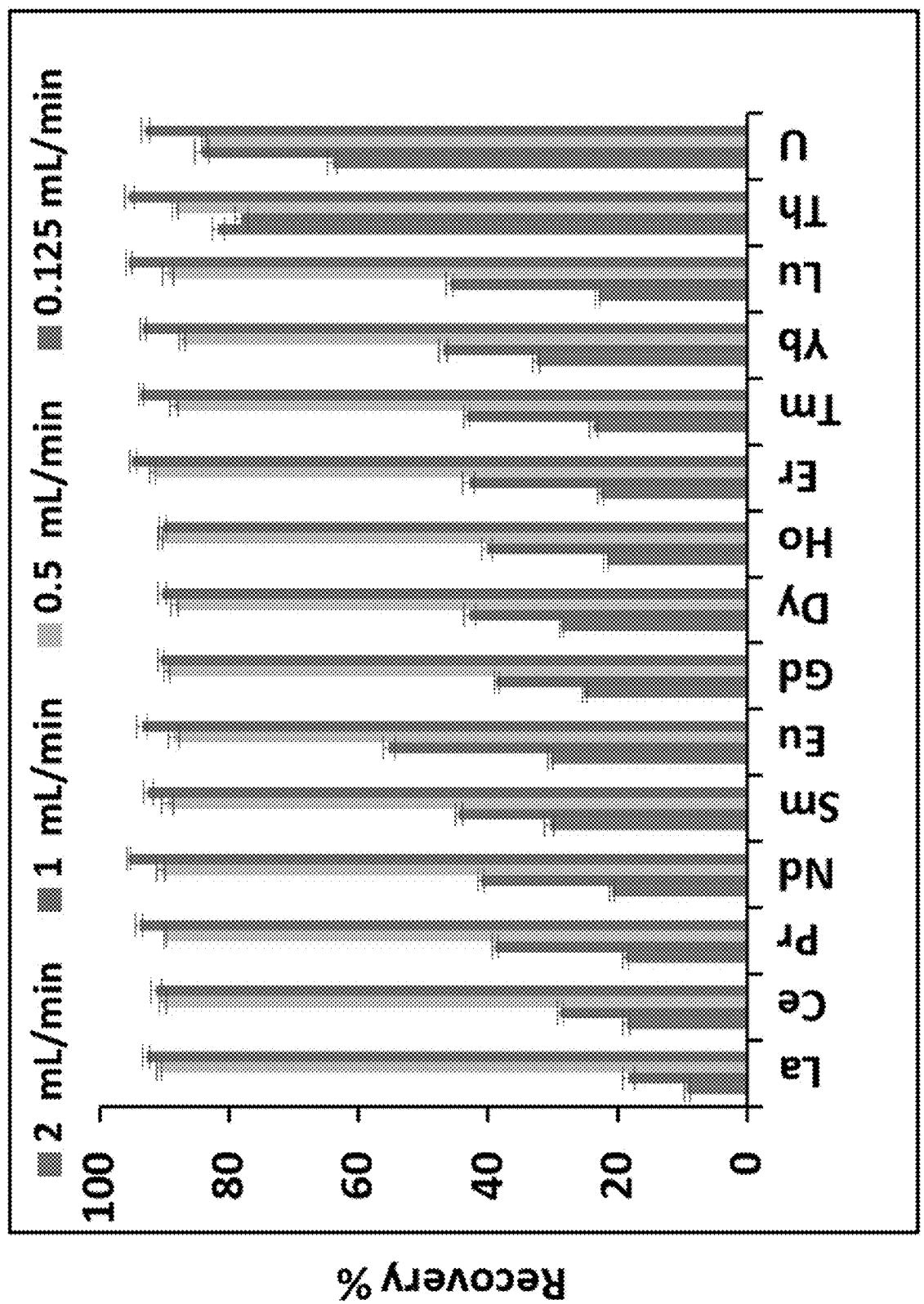

The effect of desorption flow rate on the metal ion recovery from poly(caffeic acid) was examined at desorption flow rates ranging from 0.125 to 2 mL/min. The total desorption volume was held constant at 2 mL. FIG. 9B shows quantitative recovery of metal ions was achieved in the range of 0.125-0.5 mL/min for REEs, Th, and U. The recovery drastically decreased after 1.0 mL/min due to reduced contact time between retained metal ions and desorption solution. Interestingly, the faster flow rate of 2 mL/min allowed more than 60% of Th and U to be removed while less than 30% of REEs were eluted. Based on these results, 0.125 mL/min was selected as the elution flow rate for all desorption experiments. Faster flow rates may serve as a means to develop methods to selectively separate Th and U from a mixture of metals.

Effect of Co-Existing Ions

Naturally occurring samples containing REEs are often complex mixtures with various co-existing ions at high concentrations. Therefore, a competitive sorption study was performed to investigate whether there existed any negative influence on the sorption of REEs, Th, and U to poly(caffeic acid) in the presence of a variety of abundant common metal ions. The concentration of competing ions was varied from 0.1 to 100 mg/L, while all other parameters were kept constant at the selected extraction conditions with the concentration of REEs, Th, and U fixed at 50 µg/L. The removal percentage of REEs including Th and U was not negatively impacted by the presence of high concentrations of K$^+$, Na$^+$, Ca$^{2+}$, Mg$^{2+}$, Zn$^{2+}$, Al$^{3+}$, Cu$^{2+}$, and Fe$^{2+}$ (FIG. 10). Clearly, poly(caffeic acid) exhibits efficient extraction of REEs and is suitable for the extraction of REEs in complicated matrices with up to a 200-fold excess of other common ions. The high extraction efficiency for REEs, Th, and U can be explained in terms of Pearson's hard and soft acid-base theory. Lanthanide and actinides are hard Lewis acids and thus have strong affinity for carboxylate donor moieties.

Extraction Performance

Figure 11:
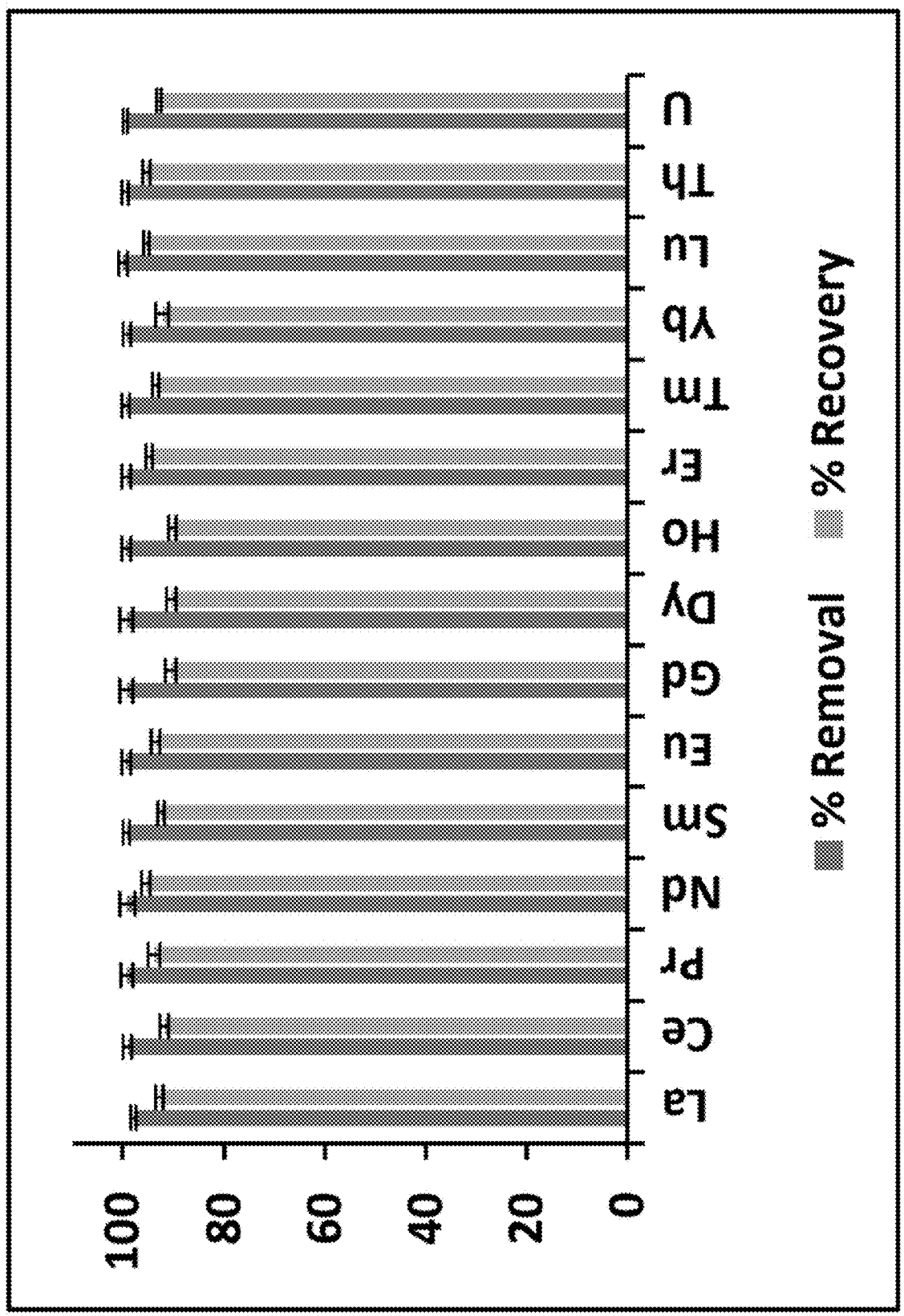
FIG. 11: Removal and recovery of REEs, Th, and U under the conditions specified in the examples herein. Extraction conditions: metal ion concentration: 50 µg/L each; pH: 6; amount of sorbent: 10 mg; sorption time: 5 min; sample volume: 40 mL; desorption volume: 2 mL; desorption solution concentration 1 M; and flow rate of 0.125 mL/min. n=3.

Under the conditions described above, the ability of poly(caffeic acid) to preconcentrate REEs, Th, and U by UAD-SPE was evaluated on the analytical scale, and the results are summarized in Table 1 and FIG. 11. Near quantitative extraction and recovery were achieved, demonstrating the ability of this polymer to remove REEs, Th, and U from a multi element solution. The average enrichment factor (EF) was 18.6±1.0. Limits of detection (LOD) ranged from 0.1-2.9 ng/L and limits of quantification (LOQ) between 0.3-9.7 ng/L were obtained. Limits of detection (LOD) were calculated based on the equation LOD=3 Sd/m, where Sd is the standard deviation of the blank and m is the slope of the calibration plot. Limits of quantification (LOQ) were determined according to the equation LOQ=10 Sd/m.

The relative standard deviations (RSDs) for five replicate determinations of 10 ng/mL of REEs, Th, and U were in the range of 2.9-3.5% with recoveries ranging from 90.2%-95.41%.

TABLE 1

Performance Characteristics for UAD-SPE for REEs, Th, and U

| Element | LOD[a] (ng/L) | LDR[b] (ug/L) | LOQ[c] (ng/L) | $R^2$ | % RSD[d] |
|---|---|---|---|---|---|
| La | 0.584 | 0.1-1000 | 1.95 | 0.9997 | 3.19 |
| Ce | 0.886 | 0.1-1000 | 2.95 | 0.9996 | 3.28 |
| Pr | 0.737 | 0.1-1000 | 2.45 | 0.9996 | 3.39 |
| Nd | 1.30 | 0.1-1000 | 4.32 | 0.9965 | 3.05 |
| Sm | 0.979 | 0.1-1000 | 3.26 | 0.9964 | 3.04 |
| Eu | 0.333 | 0.1-1000 | 1.11 | 0.9996 | 3.36 |
| Gd | 0.728 | 0.1-1000 | 2.42 | 0.9962 | 3.12 |
| Dy | 2.92 | 0.1-1000 | 9.72 | 0.9966 | 3.17 |
| Ho | 0.928 | 0.1-1000 | 3.09 | 0.9996 | 3.43 |
| Er | 0.188 | 0.1-1000 | 0.626 | 0.9997 | 3.34 |
| Tm | 0.113 | 0.1-1000 | 0.377 | 0.9996 | 3.58 |
| Yb | 0.525 | 0.1-1000 | 1.75 | 0.9962 | 2.94 |
| Lu | 1.04 | 0.1-1000 | 3.46 | 0.9995 | 3.46 |
| Th | 0.960 | 0.1-1000 | 3.20 | 0.9994 | 3.39 |
| U | 0.283 | 0.1-1000 | 0.942 | 0.9995 | 3.37 |

[a]limit of detection, [b]linear dynamic range, [c]limit of quantification, [d]% relative standard deviation, n = 5,
LOD were calculated based on the equation, LOD = 3 SD/m, where SD is the standard deviation of the blank and m is the slope of the calibration plot,
LOQ were determined according to the equation, LOQ = 10 SD/m Application of poly(caffeic acid) for the extraction and recovery of REEs, Th, and U from complex matrices including well water and produced water was demonstrated. The relative recovery was evaluated for several raw and spiked aqueous samples of varying complexity. Raw well water showed trace levels of REEs, which were not observed in the same sourced water purified by a commercial water purification system. Additionally, produced water, which is a very complex waste byproduct of oil and gas extraction and which was known to contain La, Ce, Nd, Sm, Eu, and Gd, was also evaluated. The relative recoveries of REEs, Th, and U ranged from 93.1 to 100.9% (Table 2), confirming the extraction effectiveness for REEs, Th, and U. The produced water was previously analyzed using PPy-CO$_2$ and the results obtained with poly(caffeic acid) were consistent. The relative recoveries of REEs, Th, and U were found to be ranging from 93.1 to 100.9% (Table 2).

TABLE 2

Determination of REEs, Th, and U in Various Water Samples

| | Produced Water[a] | | | Well Water before Purification[b] | | | Well Water after Purification[c] | | |
|---|---|---|---|---|---|---|---|---|---|
| Element | Added (µg/L) | Found (µg/L) | RR[d] | Added (µg/L) | Found (µg/L) | RR | Added (µg/L) | Found (µg/L) | RR |
| La | 0 | 2.71 ± 0.24 | | 0 | 0.35 ± 0.02 | | 0 | nd[e] | |
|    | 10 | 12.38 ± 0.21 | 96.7 | 10 | 10.44 ± 0.17 | 100.9 | 10 | 9.98 ± 0.50 | 99.8 |
| Ce | 0 | 0.40 ± 0.03 | | 0 | 0.20 ± 0.01 | | 0 | nd | |
|    | 10 | 10.29 ± 0.10 | 98.9 | 10 | 9.75 ± 0.58 | 95.5 | 10 | 9.78 ± 0.67 | 97.8 |
| Pr | 0 | nd | | 0 | 0.08 ± 0.01 | | 0 | nd | |
|    | 10 | 9.79 ± 0.63 | 97.9 | 10 | 9.78 ± 0.38 | 97 | 10 | 9.79 ± 0.46 | 97.9 |
| Nd | 0 | 0.41 ± 0.01 | | 0 | 0.07 ± 0.02 | | 0 | nd | |
|    | 10 | 9.87 ± 0.08 | 94.6 | 10 | 10.02 ± 0.34 | 99.5 | 10 | 9.62 ± 0.49 | 96.2 |
| Sm | 0 | 0.05 ± 0.01 | | 0 | 0.09 ± 0.01 | | 0 | nd | |
|    | 10 | 10.01 ± 0.14 | 99.6 | 10 | 10.12 ± 0.21 | 100.3 | 10 | 9.57 ± 0.58 | 95.7 |
| Eu | 0 | 0.03 ± 0.01 | | 0 | 0.05 ± 0.01 | | 0 | nd | |
|    | 10 | 9.92 ± 0.07 | 98.9 | 10 | 9.52 ± 0.13 | 94.7 | 10 | 9.48 ± 0.37 | 94.8 |
| Gd | 0 | 0.21 ± 0.01 | | 0 | 0.05 ± 0.01 | | 0 | nd | |
|    | 10 | 9.97 ± 0.10 | 97.6 | 10 | 9.71 ± 0.019 | 96.6 | 10 | 9.67 ± 0.21 | 96.7 |
| Dy | 0 | nd | | 0 | 0.06 ± 0.01 | | 0 | nd | |
|    | 10 | 9.59 ± 0.57 | 95.9 | 10 | 9.86 ± 0.21 | 98 | 10 | 10.08 ± 0.44 | 100.8 |
| Ho | 0 | nd | | 0 | 0.05 ± 0.01 | | 0 | nd | |
|    | 10 | 9.89 ± 0.10 | 98.9 | 10 | 9.73 ± 0.32 | 96.8 | 10 | 9.31 ± 0.13 | 93.1 |
| Er | 0 | nd | | 0 | 0.08 ± 0.01 | | 0 | nd | |
|    | 10 | 9.40 ± 0.10 | 94 | 10 | 10.05 ± 0.47 | 99.7 | 10 | 9.51 ± 0.88 | 95.1 |
| Tm | 0 | nd | | 0 | 0.07 ± 0.01 | | 0 | nd | |
|    | 10 | 9.83 ± 0.21 | 98.3 | 10 | 9.77 ± 0.51 | 97 | 10 | 9.92 ± 0.53 | 99.2 |
| Yb | 0 | nd | | 0 | 0.05 ± 0.01 | | 0 | nd | |
|    | 10 | 9.78 ± 0.29 | 97.8 | 10 | 9.76 ± 0.16 | 97.1 | 10 | 9.96 ± 0.70 | 99.6 |
| Lu | 0 | nd | | 0 | 0.07 ± 0.01 | | 0 | nd | |
|    | 10 | 9.61 ± 0.14 | 96.1 | 10 | 10.07 ± 0.21 | 100 | 10 | 9.86 ± 1.51 | 98.6 |
| Th | 0 | nd | | 0 | 0.05 ± 0.02 | | 0 | nd | |
|    | 10 | 9.99 ± 0.34 | 99.9 | 10 | 9.85 ± 0.37 | 98 | 10 | 9.69 ± 0.60 | 96.9 |
| U  | 0 | nd | | 0 | 0.07 ± 0.01 | | 0 | nd | |
|    | 10 | 9.48 ± 0.10 | 94.8 | 10 | 9.85 ± 0.42 | 97.8 | 10 | 10.02 ± 0.76 | 100.2 |

[a]Produced water sample (PW) collected from Permian Basin site (West Texas);
[b]Well water sample collected from a well in Toledo, Ohio;
[c]Well water sample after treatment;
[d]Relative recovery (%);
[e]Not detected.

The ability of poly(caffeic acid) to extract and determine REEs in aqueous media was compared with other materials reported in the literature. Compared with the methods listed in Table 3, poly(caffeic acid) allows for a fast, straightforward approach for the extraction of REEs with excellent removal and recovery characteristics. Furthermore, since the sorbent can be easily prepared and does not require any solid support, a post modification step is also not required. A comparison between the figures of merit in the examples herein and some conventional methods (referred to as comparison methods) for the extraction and determination of REEs from aqueous samples is summarized in Table 3.

TABLE 3

Comparison of Different Sorbents used for the SPE based Extraction and Determination of REEs

| Analyte | Support | Sorbent | Sorbent amount (mg) | Time to prepare sorbent (h) | Extraction time (min) | Sorption Capacity (mg g$^{-1}$) | LOD (ng/L) | LOQ (ng/L) |
|---|---|---|---|---|---|---|---|---|
| REEs, Th and U | none | CA polymer | 10 | 3 | 5 | 161.7-La | 0.1-2.9 | 0.3-9.7 |
| REEs, HMs | none | PPy-CO$_2$[a] | 10 | 12 | 5 | NR | 0.2-5.7 | 0.7-19.2 |
| REEs | silica | BPHA[b] | 10 | 34 | 30 | 6.7-Eu 8.2-Tb | NR[K] | NR |
| REEs | none | OGO[c] | 40 | 24 | 15 | 6.1-12.2 | 0.01-1.08 | 0.05-3.26 |
| REEs | Chromosorb 106[d] | TAR[e] | 40 | 51 | NR | 81.1-108.0 | 0.06-0.31 | NR |
| REEs | Amberlite XAD-4 | PDCA[f] | 20 | 15 | NR | 49.0-66.7 | 6-298 | NR |
| REEs | silica | Cyanex 272 | 100 | 12 | 60 | 38.23-La | NR | NR |
| REEs | Glass cartridge | PHA[g] | 100 | 48 | 5 | 139-Sm | 0.13-0.44 | NR |
| La | cellulose | PCMC[h] | 20 | 26 | 180 | 170 | NR | NR |
| REEs | Chitosan | IP-PVP[i] | 50 | 17 | 120 | 39.34-La | NR | NR |
| REEs | Straw | IIP[j] | 100 | 25 | 5 | 125-La | NR | NR |

[a]poly (pyrrole-1-carboxylic acid),
[b]N-Benzoyl-N-phenylhydroxylamine,
[c]Oxidized graphene oxide,
[d]Styrene-divinylbenzene-based polymers,
[e]4-(2-thiazolylazo) resorcinol,
[f]2,6-pyridinedicarboxaldehyde,
[g]Polyhydroxamic acid,
[h]poly(carboxymethyl) cellulose,
[i]Ion-imprinted polyvinylpyrrolidone,
[j]Ion imprinted polymer,
[k]Not detected, Metal Ion Sorption Capacity of Poly(Caffeic Acid)

Figure 14:
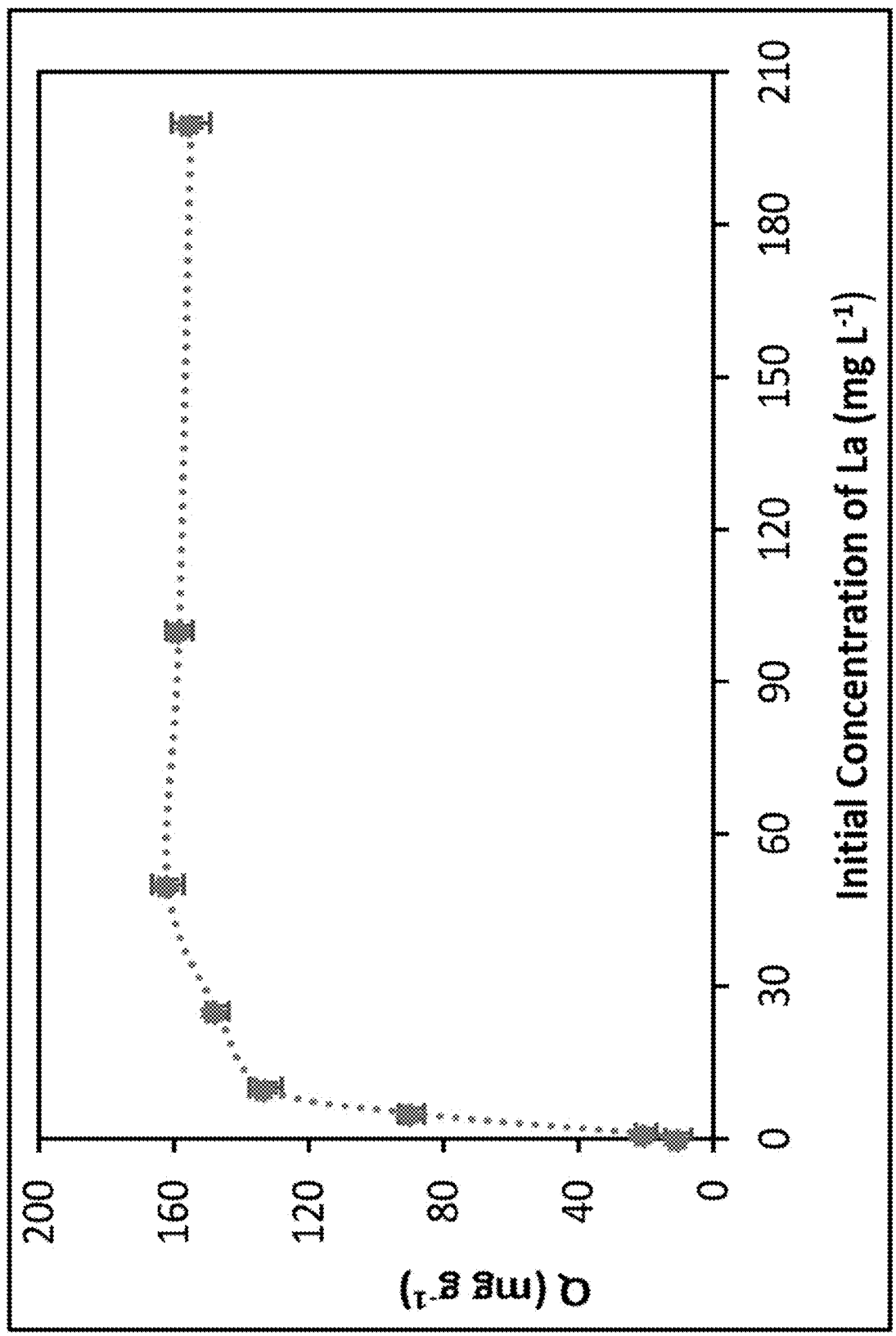
FIG. 14: Plot of sorption capacity as a function of initial concentration of La (mg $L^{-1}$). Conditions: amount of polymer: 10 mg, pH of metal ion solution: 6.0, sample volume: 40 mL, extraction time: 24 h; n=3.

Investigating the sorption capacity of a new sorbent is important to understand the ability for bulk scale removal of metal ions from sample solutions. Lanthanum was chosen as a representative REE to evaluate the metal ion sorption capacity by poly(caffeic acid). An individual standard solution of 200 mg L$^{-1}$ (200 ppm) of lanthanum nitrate was prepared and diluted to obtain solutions of various concentrations (0.1, 1, 5, 10, 25, 50, 100 and 200 mg L$^{-1}$). Initially, 10 mg of poly(caffeic acid) was added to a 40 mL aqueous solution in a polypropylene tube containing the appropriate concentration of lanthanum (pH adjusted to 6.0). The solution was sonicated for 24 h after which the analyte solution containing poly(caffeic acid) was transferred to a syringe and filtered using a 0.22 μm PTFE syringe filter. Finally, the filtrate was analyzed by ICP-MS to determine the lanthanum ion removed by poly(caffeic acid). The sorption capacity was then calculated using the following equation:

$$\text{Sorption Capacity } (Q) = \frac{(C_o - C_e) \times V}{m} \quad (4)$$

where Q, $C_o$, $C_e$, V, and m represent the sorption capacity per gram of sorbent, the initial metal ion concentration (mg L$^{-1}$) in the sample, the remaining concentration (mg L$^{-1}$) of metal ion in the sample solution after extraction and filtration, metal ion solution volume (L), and weight of the sorbent (g), respectively. The capacity of poly(caffeic acid) for La was found to be 161.7 mg/g, demonstrating the promise of poly(caffeic acid) for larger scale extractions and recovery in addition to the ability to screen sources for the presence of REEs (FIG. 14).

Reusability of Poly(Caffeic Acid) for Repetitive Experimentation

Figure 15:
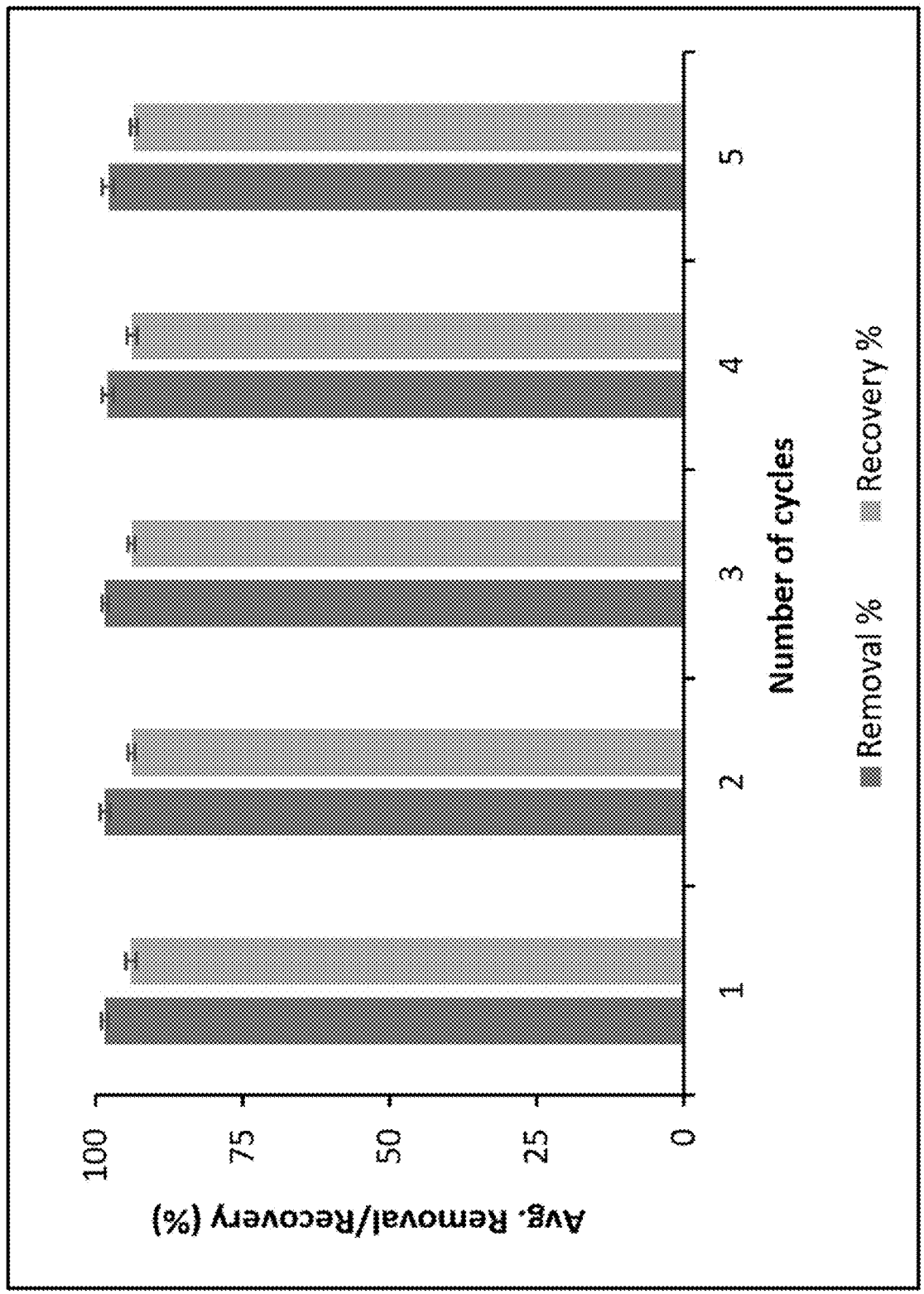
FIG. 15: Average Removal and Recovery (%) for REEs, Th, and U as function of the number of repetitive sorption-desorption cycles under conditions described in the examples herein. Extraction conditions: metal ion concentration: 50 µg/L each; pH: 6; amount of sorbent: 10 mg; sorption time: 5 min; sample volume: 40 mL; desorption volume: 2 mL; desorption solution concentration 1 M; and flow rate of 0.125 mL/min.

Reusability is a key factor for evaluating the performance of new sorbent materials providing important information for developing efficient, economical, and sustainable applications. The reusability of poly(caffeic acid) was investigated for five consecutive extractions at the selected conditions by measuring the removal and recovery efficiencies of REEs, Th, and U. After each extraction, the sorbent was washed with (2×10 mL) DI water in order to remove traces of nitric acid and then dried at room temperature. The results are summarized in FIG. 15. The average removal and recovery efficiency of the sorbent remained above 97.9% and 93.5%, respectively, even at the end of the fifth extraction. This indicates that poly(caffeic acid) is stable and can be readily recycled for repetitive experiments, reducing waste generation and minimizing the cost for analyses. Additionally, two different batches of poly(caffeic acid) were evaluated and no significant change in removal efficiency was observed, ensuring that different syntheses produce consistent and reproducible results from the produced polymer (FIG. 15).

CONCLUSIONS

In conclusion, an environmentally friendly, low cost sorbent material, poly(caffeic acid), was employed for the preconcentration and extraction of REEs, Th, and U in aqueous media. Poly(caffeic acid) is an air stable stand-alone polymer requiring no solid support material for ease of use in a variety of applications. Extraction by poly(caffeic acid) is attractive owing to its insolubility and high degree of dispersibility in water, and rapid coordination of the target metals at the trace level with excellent precision, or for large capacity extractions even in complex aqueous samples. Poly(caffeic acid) offers simplicity, low detection limits, better precision, low consumption of sorbent amount, and a shorter extraction time compared to conventional sorbent materials. Moreover, poly(caffeic acid) shows excellent determination of target metals in the presence of interfering species. Poly(caffeic acid) is therefore a useful material for the extraction of critical REE elements as well as Th and U.

Certain embodiments of the compositions and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the compositions and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A method for extracting a metal from a solution, the method comprising:
    dispersing a sorbent material in an aqueous solution containing a metal species to form a dispersed solution in which the metal species coordinates with the sorbent material; and
    removing the sorbent material from the dispersed solution to extract the metal species from the aqueous solution;
    wherein the sorbent material comprises poly(caffeic acid); and
    wherein the metal species comprises a rare earth element, Th, or U.

2. The method of claim 1, wherein the poly(caffeic acid) has a diamine crosslinker.

3. The method of claim 1, wherein the poly(caffeic acid) has an ethylenediamine crosslinker.

4. The method of claim 1, wherein the sorbent material comprises Formula I:

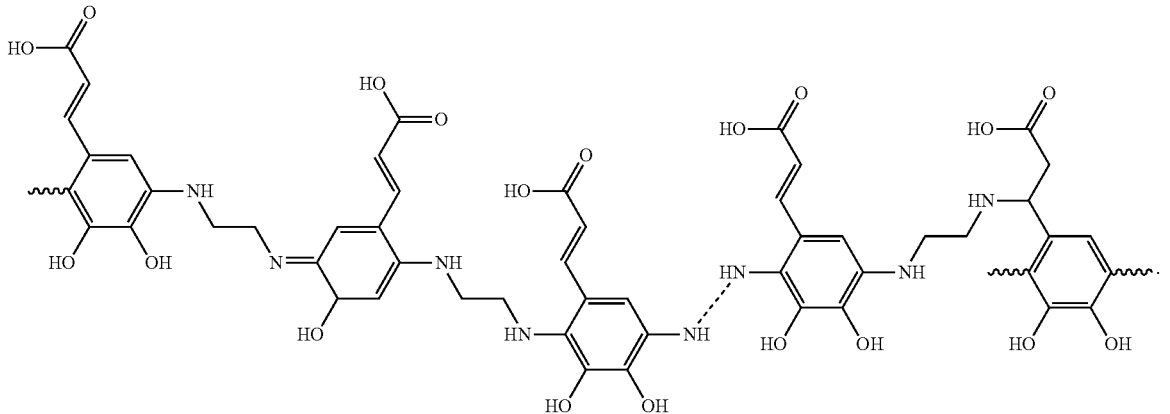

5. The method of claim 1, wherein the sorbent material is dispersed in the aqueous solution without a support.

6. The method of claim 1, wherein the sorbent material is bound to a support.

7. The method of claim 1, wherein the sorbent material is not bound to a support.

8. The method of claim 1, wherein the metal species includes one or more of La, Ce, Pr, Nd, Sm, Eu, Gd, Dy, Ho, Er, Tm, Yb, Lu, Th, and U.

9. The method of claim 1, wherein the aqueous solution comprises a plurality of rare earth elements, and each of the plurality of rare earth elements is extracted by the sorbent material.

10. The method of claim 1, wherein the dispersing comprises mixing the sorbent material in the aqueous solution with ultra-sonication for a period of time.

11. The method of claim 1, wherein the aqueous solution has a pH ranging from 2.0 to 6.0.

12. The method of claim 1, wherein the dispersing is conducted at room temperature.

13. The method of claim 1, wherein the removing comprises filtering the dispersed solution to separate the sorbent material from the dispersed solution.

14. The method of claim 13, further comprising analyzing a filtrate from the filtering to determine a percent removal of the metal species.

15. The method of claim 1, further comprising washing the removed sorbent material with a desorption solvent to desorb the metal species from the sorbent material.

16. The method of claim 15, further comprising collecting the desorption solvent after the washing and analyzing the collected desorption solvent to determine a percent recovery of the metal species.

17. The method of claim 15, further comprising re-using the sorbent material for a further extraction of rare earth elements, Th, or U.

18. The method of claim 1, wherein the aqueous solution further comprises one or more non-rare earth metal ion species.

19. A composition comprising poly(caffeic acid) dispersed in an aqueous solution containing a metal species comprising a rare earth element, Th, or U.

20. The composition of claim 19, wherein the poly(caffeic acid) is crosslinked with a diamine.

* * * * *